United States Patent
Abboa-Offei et al.

(10) Patent No.: US 9,854,317 B1
(45) Date of Patent: Dec. 26, 2017

(54) ENABLING VIDEO VIEWER INTERACTION

(71) Applicant: WEW Entertainment Corporation, Brooklyn, MA (US)

(72) Inventors: Kwabena Benoni Abboa-Offei, Brooklyn, NY (US); Maurice Courtois, Basel (CH)

(73) Assignee: WEW Entertainment Corporation, Brooklyn, NY (US)

( * ) Notice: Subject to any disclaimer, the term of this patent is extended or adjusted under 35 U.S.C. 154(b) by 0 days.

(21) Appl. No.: 14/949,543

(22) Filed: Nov. 23, 2015

Related U.S. Application Data

(60) Provisional application No. 62/083,788, filed on Nov. 24, 2014.

(51) Int. Cl.
| | |
|---|---|
| *H04N 21/4788* | (2011.01) |
| *H04N 21/482* | (2011.01) |
| *H04N 21/45* | (2011.01) |
| *H04N 21/4627* | (2011.01) |
| *H04N 21/2343* | (2011.01) |
| *H04N 21/258* | (2011.01) |

(52) U.S. Cl.
CPC . *H04N 21/4788* (2013.01); *H04N 21/234309* (2013.01); *H04N 21/25875* (2013.01); *H04N 21/4532* (2013.01); *H04N 21/4627* (2013.01); *H04N 21/4821* (2013.01)

(58) Field of Classification Search
CPC ......... H04N 21/4788; H04N 21/23409; H04N 21/25875; H04N 21/4532; H04N 21/4627; H04N 21/4821
See application file for complete search history.

(56) References Cited

U.S. PATENT DOCUMENTS

| | | | |
|---|---|---|---|
| 5,995,096 A | 11/1999 | Kitahara et al. | |
| 6,954,498 B1 | 10/2005 | Lipton | |
| 7,627,831 B2 | 12/2009 | Chiu et al. | |
| 9,143,834 B2 | 9/2015 | Abboa-Offei | |
| 9,154,845 B1 | 10/2015 | Abboa-Offei et al. | |
| 2005/0229233 A1 | 10/2005 | Zimmerman et al. | |

(Continued)

OTHER PUBLICATIONS

U.S. Appl. No. 61/536,968, filed Sep. 20, 2011, Skelton et al.

(Continued)

*Primary Examiner* — Pankaj Kumar
*Assistant Examiner* — Alexander Boyd
(74) *Attorney, Agent, or Firm* — Choate, Hall & Stewart LLP

(57) ABSTRACT

An example process includes: storing a profile of a user of an interactive video system; receiving a selection from a computing device of the user to watch a channel of video that is available through the interactive video system; adding, based on the selection, at least some of the identifying information to a data structure; identifying, based on the data structure, a group of users, which includes the user, who are watching the channel of video during a same time period; generating data representing graphical objects associated with the users in the group who are watching the channel of video during the same time period and available to interact via the interactive video system; and outputting the data to the video device of the user to enable rendering the graphical objects on a display screen of the video device.

36 Claims, 14 Drawing Sheets

(56) References Cited

U.S. PATENT DOCUMENTS

| | | |
|---|---|---|
| 2006/0173838 A1 | 8/2006 | Garg et al. |
| 2007/0240180 A1 | 10/2007 | Shanks et al. |
| 2008/0059580 A1 | 3/2008 | Kalinowski et al. |
| 2008/0059986 A1 | 3/2008 | Kalinowski et al. |
| 2008/0104536 A1 | 5/2008 | Mori |
| 2008/0247650 A1 | 10/2008 | Amir et al. |
| 2008/0250450 A1 | 10/2008 | Larner et al. |
| 2009/0064101 A1 | 3/2009 | Boss et al. |
| 2009/0116702 A1 | 5/2009 | Conradt et al. |
| 2009/0150939 A1 | 6/2009 | Drucker et al. |
| 2009/0322784 A1* | 12/2009 | Sartori ................. H04N 21/426 725/93 |
| 2009/0326953 A1 | 12/2009 | Peralta Gimenez et al. |
| 2010/0011389 A1* | 1/2010 | Lee ..................... H04N 21/84 725/14 |
| 2010/0058220 A1 | 3/2010 | Carpenter |
| 2010/0079681 A1* | 4/2010 | Coburn ............... H04N 21/482 348/734 |
| 2010/0088623 A1 | 4/2010 | Ichino |
| 2010/0329633 A1 | 12/2010 | Lafond et al. |
| 2011/0138425 A1* | 6/2011 | Kim ................. H04N 21/43615 725/56 |
| 2011/0154383 A1* | 6/2011 | Hao ................. H04N 21/43615 725/8 |
| 2011/0289422 A1 | 11/2011 | Spivack et al. |
| 2012/0023534 A1 | 1/2012 | Dasilva et al. |
| 2012/0033950 A1 | 2/2012 | Cordray |
| 2012/0059825 A1 | 3/2012 | Fishman et al. |
| 2012/0124620 A1 | 5/2012 | Nishizawa et al. |
| 2012/0213490 A1 | 8/2012 | Steiner |
| 2012/0254917 A1 | 10/2012 | Burkitt et al. |
| 2012/0284752 A1* | 11/2012 | Jung ................. H04N 21/4788 725/41 |
| 2012/0290508 A1 | 11/2012 | Bist |
| 2012/0311032 A1 | 12/2012 | Murphy et al. |
| 2012/0323908 A1 | 12/2012 | Herbert, Jr. et al. |
| 2013/0007792 A1 | 1/2013 | Jeon et al. |
| 2013/0074109 A1 | 3/2013 | Skelton et al. |
| 2013/0191765 A1 | 7/2013 | Andersson Reimer et al. |
| 2013/0227612 A1 | 8/2013 | Abboa-Offei |
| 2014/0013353 A1 | 1/2014 | Mathur |
| 2014/0089423 A1 | 3/2014 | Jackels |
| 2014/0222462 A1 | 8/2014 | Shakil et al. |
| 2014/0270680 A1* | 9/2014 | Bloch ................. H04N 21/4305 386/201 |
| 2014/0317660 A1* | 10/2014 | Cheung ............. H04N 21/4788 725/44 |

OTHER PUBLICATIONS

File History for U.S. Appl. No. 14/339,695, 193 pages (Downloaded Nov. 23, 2016).
File History for U.S. Appl. No. 14/845,073, 133 pages (Downloaded Nov. 23, 2016).
Screen capture of images from video clip showing drag and drop features of Tesla touchscreen display (one page) (captured Jun. 9, 2015).
Tesla Model S Owner's Manual (145 pages) (Copyrgt. 2012-2013).
Tesla Model S: A Quick Guide for Owners (36 pages) (2012).
Tesla, The Model S 17" Touchscreen Display, YouTube video clip (Published Mar. 25, 2013). URL: https://www.youtube.com/watch?v=TZ0HsN-tblo&feature=youtu.be.
U.S. Final Office in U.S. Appl. No. 14/339,694, dated May 13, 2015 (23 pages).

* cited by examiner

ENABLING VIDEO VIEWER INTERACTION

CROSS-REFERENCE TO RELATED APPLICATION

This application claims the benefit of, and priority to, U.S. Provisional Application No. 62/083,788, filed on Nov. 24, 2014. The contents of U.S. Provisional Application No. 62/083,788 are incorporated herein by reference.

TECHNICAL FIELD

This specification relates generally to enabling viewers of video to interact through an interactive video viewing system.

BACKGROUND

Audio-video content, such as television programs or movies, may be viewed on a variety of devices including, but not limited to, smartphones, tablets, smart televisions, and computers. Connections to the Internet, or other network(s), allow user of such devices to select program-related content for viewing.

SUMMARY

This specification describes systems, methods and apparatus, including computer program products, for communication and content viewing.

An example process for enabling video viewer interaction may include the following operations: storing, in computer memory, a profile of a user of an interactive video system implemented by one or more servers, the profile comprising identifying information for the user, at least some of the identifying information being unique to the user; receiving, by one or more processing devices, a selection from a computing device of the user to watch a channel of video that is available through the interactive video system, the selection being identifiable as being from the user; adding, by one or more processing devices and based on the selection, at least some of the identifying information to a data structure stored in computer memory, the data structure associating the at least some identifying information with the channel of video corresponding to the selection; identifying, by one or more processing devices and based on the data structure, a group of users, which includes the user, who are watching the channel of video during a same time period; generating, by one more processing devices, data representing graphical objects associated with the users in the group who are watching the channel of video during the same time period and available to interact via the interactive video system; and outputting the data to the video device of the user to enable rendering the graphical objects on a display screen of the video device. The example process may include one or more of the following features, either alone or in combination.

The identifying information may comprise one or more of the following: an authentication key associated with the user, an authentication key identifier associated with the user, a web socket identifier associated with the user, a web socket pointer identifier associated with the user, a user profile number, or a network address associated with the user.

The example process may comprise, prior to receiving: receiving, by one or more processing devices, account information from the computing device of the user, the account information identifying an account of the user for a video provider of the user; authenticating, by one or more processing devices and based on at least some of the account information, the account of the user; and opening, by one or more processing devices and based on the authenticating, a network connection to enable streaming of data for the channel of video from the video provider to the video device of the user. The network connection may pass through the one or more servers of the interactive video system, and the process may comprise performing, by one or more processing devices, conversion of video data from one or more computing devices of the video provider to a format that is compatible for streaming over the network connection. Conversion of the video data may occur in real-time, and may be from an MPEG-based format to the format that is compatible for streaming over the network connection.

The example process may comprise: generating, by one or more processing devices, data representing an electronic program guide, the electronic program guide displaying one or more elements corresponding to different channels of video; and outputting, by one or more processing devices, the data to the video device of the user to render the electronic program guide on the display screen of the video device of the user. The selection may be based on interaction with one or more of the elements of the electronic program guide. The electronic program guide may include a virtual alphanumeric keypad. Interaction with the one or more elements may occur through interaction with the virtual alphanumeric keypad.

The example process may include: receiving, by one or more processing devices, a selection from the computing device of the user of a graphical object corresponding to a different user, or group of users, available to interact via the interactive video system; and hosting, by one or more processing device and based on the selection, a chat session between at least the user and the different user. Hosting the chat session may comprise generating, by one or more processing devices, data representing the chat session, and outputting, by one or more processing devices, the data representing the chat session to the computing device of the user and to a computing device of the different user.

The example process may comprise: outputting, by one or more processing devices, data to the video device of the user representing an electronic program guide, the electronic program guide comprising elements representing channels of video that are accessible through the electronic program guide, the data comprising data tags associated with the elements, the data tags being user-specific. The selection may be based on user interaction with the electronic program guide and comprises a data tag associated with the user, the selection being identifiable as being from the user because of the data tag.

The data structure may comprise a linked list or a hashmap, the linked list or hashmap associating users with channels of video that the users are viewing during a same time period. The video device of the user may be the computing device of the user, or the video device of the user may be a television or other video-capable device that is different from the computing device of the user.

The example process may comprise outputting, by one or more processing devices, data to the video device of the user representing an electronic program guide, the electronic program guide comprising elements representing channels of video that are accessible through the electronic program guide, where video offerings are ordered and displayed dynamically according to maintained statistics. The example process may comprise outputting, by one or more processing devices, data to the video device of the user representing an electronic program guide, the electronic program guide comprising elements representing channels of video that are accessible through the electronic program guide, where video offerings are ordered and displayed dynamically according to statistics maintained by the system, where the statistics include the number of unique IDs created by the system in response to a user's request to view a particular show, the number of Web socket identifiers that relate to a particular show, authentication keys associated with users, and the number of converted-video streams that relate to a particular show.

An example process may include the following operations: identifying, by one or more processing devices, content that corresponds to a quotation in electronic communications over a network; determining, by one or more processing devices, a number of times that the content has been posted to the network; determining, by one or more processing devices, that the number of times exceeds a predefined threshold; inferring, by one or more processing devices, a popularity of the content because the number of times exceeds the threshold; associating, by one or more processing devices, the popularity with programming in an electronic program guide; reordering, by one or more processing devices, the programming in the electronic program guide based on the popularity; and outputting the data to a processing device to enable rendering the electronic programming guide on a video screen. The network may comprise a social network and the content may comprise a quotation from content that is aired outside of the social network.

An example process may comprise: receiving, by one or more processing devices, text from an electronic communication in a network; identifying, by one or more processing devices, a sentiment associated with the text by applying one or more predefined rules to the text, the one or more predefined rules being stored in a database in computer memory and being based on patterns in other instances of text; associating, by one or more processing devices, the sentiment with programming in an electronic program guide; reordering, by one or more processing devices, the programming in the electronic program guide based on the sentiment; and outputting the data to a processing device to enable rendering the electronic programming guide on a video screen. The network may comprise a social network and the predefined rules may be generated during a training phase based on other text that has one or more features in common with the text form the electronic communication network.

An example process may comprise: determining, by one or more processing devices, popularity of programs airing on television during a time period, the determining being based, at least in part, on electronic communications in a network; and ordering, by one or more processing devices, articles in a dynamic online periodical based on the popularity of the programs airing on television during a time period, the programs airing on television during a time period having at least one feature in common with the articles in the dynamic online periodical.

Determining the popularity of the program may comprise: identifying programs that correspond to quotations in electronic communications over a network, such as a social network; determining a number of times that the information about a program has been posted to a social network; determining that the number of times exceeds a predefined threshold; and inferring that the program is popular or trending because the number of times exceeds the threshold.

Any two or more of the features described in this specification, including in this summary section, may be combined to form embodiments not specifically described in this patent application.

All or part of the systems and techniques described herein may be implemented as a computer program product that includes instructions that are stored on one or more non-transitory machine-readable storage media, and that are executable on one or more processing devices. Examples of non-transitory machine-readable storage media include e.g., read-only memory, an optical disk drive, memory disk drive, random access memory, and the like. All or part of the systems and techniques described herein may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF THE DRAWINGS

Like reference numerals in different figures indicate like elements.

DETAILED DESCRIPTION

Described herein are example processes for enabling communication and content viewing. The example processes enable a user to view content, such as a television broadcast, while also enabling and viewing electronic communications, such as chat sessions, associated with that content.

The example techniques described herein may be used in any appropriate context, and are not limited to use with any particular system. An example system in which the techniques described herein may be used is presented below.

Electronic Program Guide

Figure 1:
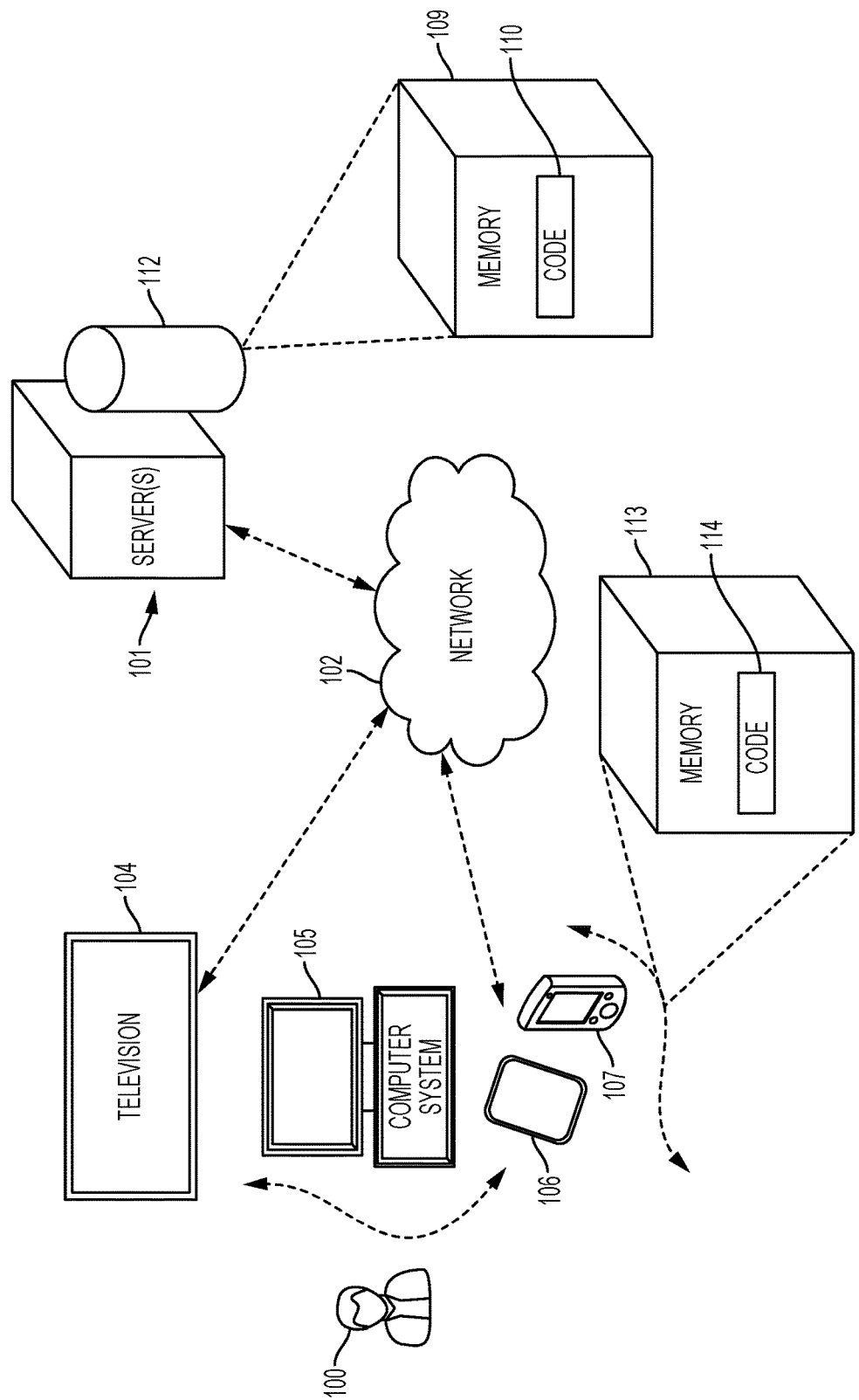
FIG. 1 is a block diagram of an example system on which processes enabling communication and content viewing may be implemented.

Referring to FIG. 1, an example interactive video system includes an interactive electronic program guide (e.g., FIG. 2) that is controllable by a user 100. The example system may be implemented in a multimedia application that includes a dynamic communications interface (e.g., FIG. 5). The dynamic communications interface enables and encourages users of the system to interact and, in some cases, to view the reactions of others, while watching content, such as broadcast television. The interface, which may be a Web page or other type of portal, may provide users with the opportunity to view the profile information of people who are watching content at a given time, and to select users for a chat experience. The profile information may be input into the system or downloaded from external social media platform(s).

The example interactive video system may be hosted by one or more servers (server) 101, which are accessible over a network 102, such as the Internet, either over wired or wireless connection(s). For example, user 100 may access a Web site hosted by the one or more servers to obtain access to the example interactive video system. User 100 may access the example interactive video system through any one or more user devices, such as television 104, computer 105, portable device 106, smartphone 107, etc. The Web site may be generated by one or more processing devices in the server executing code 110 stored in memory 109 of server 101. The Web site operations may be controlled by server 101 alone or in conjunction with executable code 114 that is stored in memory 113 on, and executed by, one or more processing devices of a user device.

Figure 2:
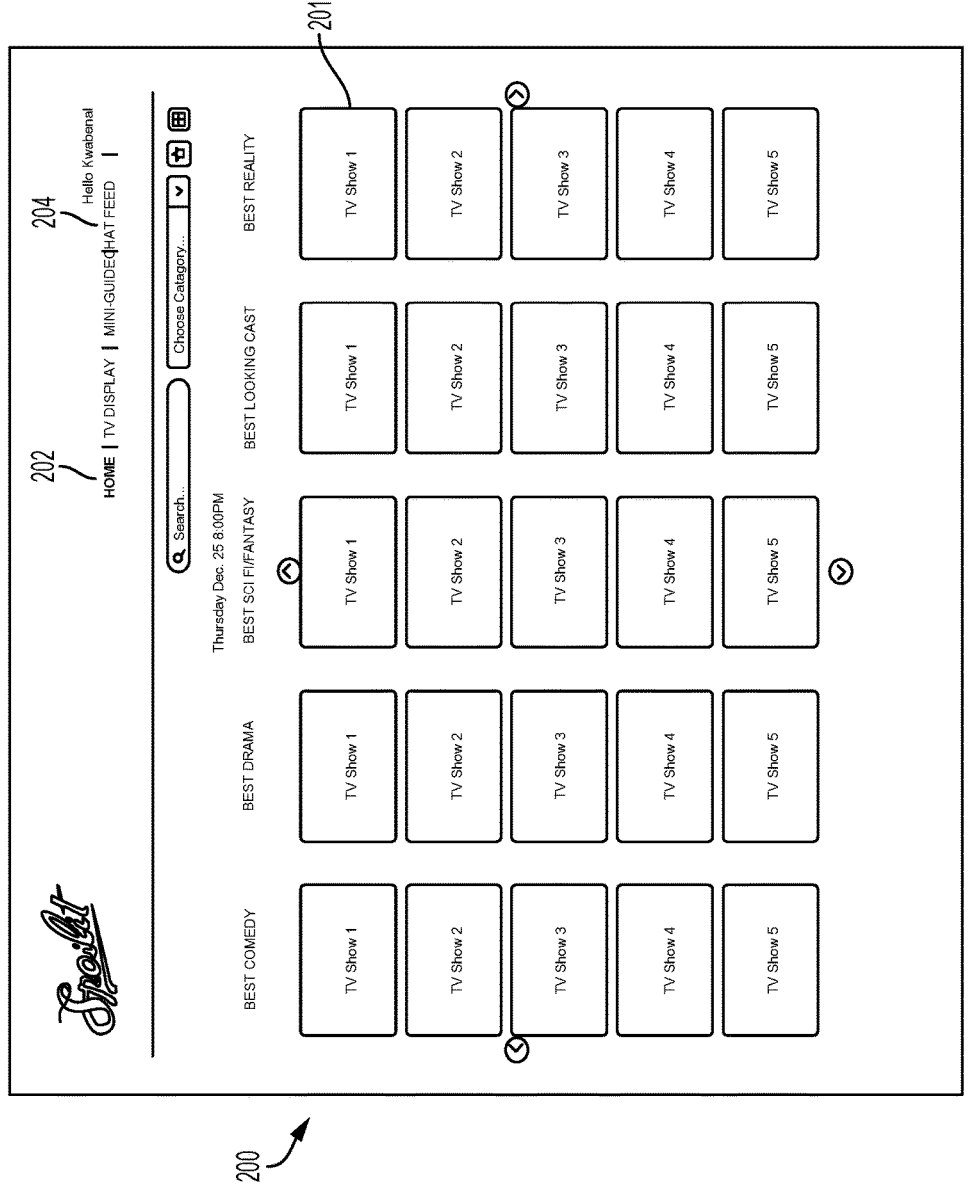
FIG. 2 is a block diagram of an example electronic program guide.

In an example implementation, upon accessing the system, the user may be presented with an electronic program guide, such as guide 200 shown in FIG. 2. The user may select guide 200 by selecting "HOME" menu option 202 from menu 204. Guide 200 may contain audio-video content (e.g., television programs, movies, and the like) that the user may access via their device (e.g., computer, tablet, smartphone, smart television, or the like). The content may be all content available to that user (e.g., through a subscription service) or content that is trending on social media or on the system itself. The user may select a program ("TV Show") 201 to view by clicking-on, touching, or otherwise identifying that program. In some implementations, the system enables a two-screen experience and in some implementations, the system enables a one-screen experience. The user may configure the system for a one-screen or two-screen experience. In an example two-screen experience, the selected program is viewed on one screen (e.g., on television 104's screen) and related content (such as the dynamic online periodical described below) is viewed on a second screen (e.g., computer 105's screen). In an example one-screen experience, the selected program and related content are both viewed on the same portal on the same screen (e.g., on the screen of computer 105 or television 104).

In an example one-screen experience, the user selects a program 201 from guide 200. In response, the system automatically (e.g., without user intervention) obtains content for the program 200, and identifies other users registered with the system who are currently viewing that program.

Figure 3:
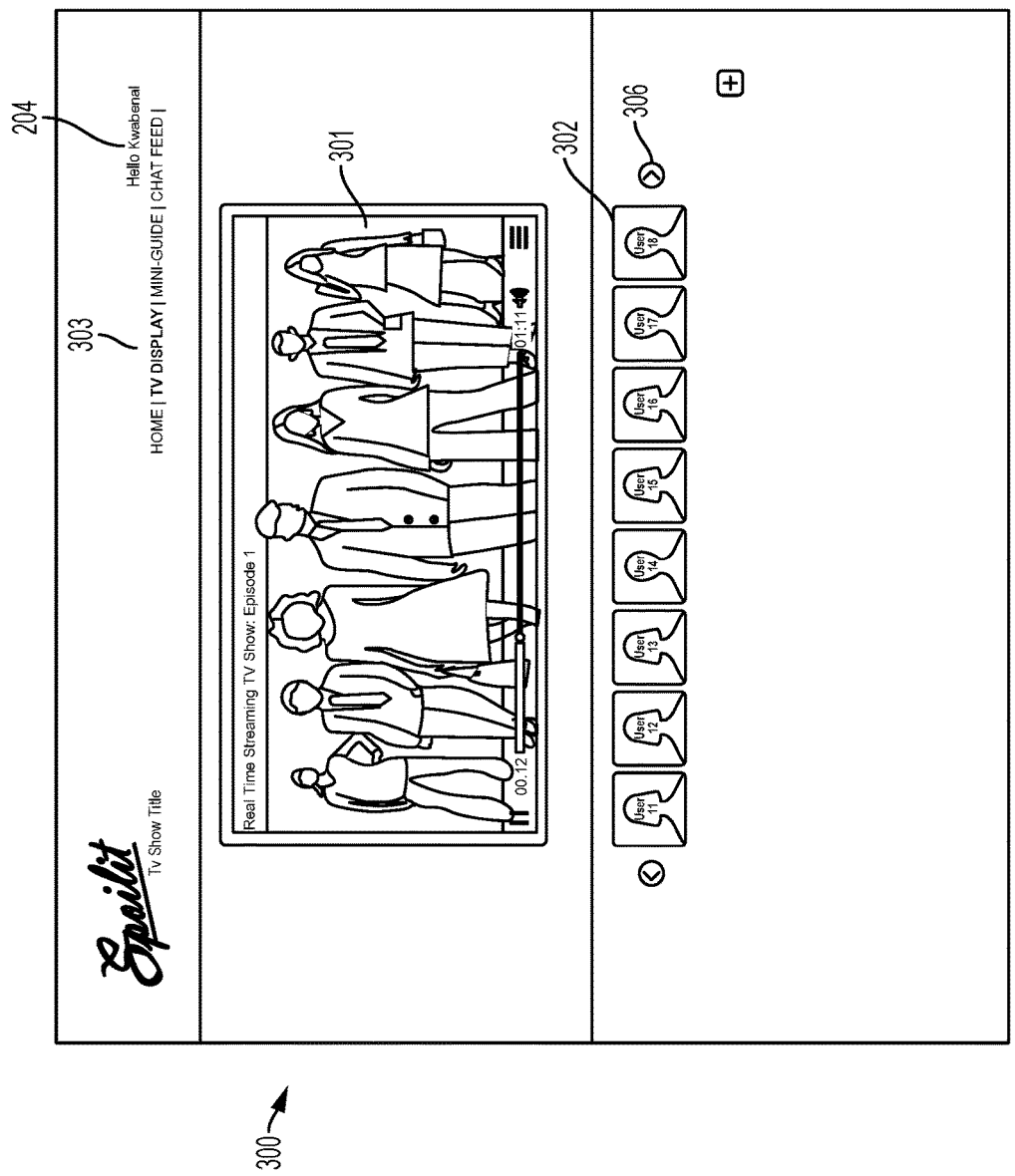
FIG. 3 is a block diagram of an example page for viewing audio-video content and for selecting one or more users for chat.

The system generates data for a portal, such as Web page 300 of FIG. 3. As in the case with the other screen-shots shown herein, user settings may dictate portal display and functionality. In this example, the user may configure, and display, the portal of Web page 300 by selecting "TV DISPLAY" menu option 303 from menu 204.

In this example implementation, Web page 300 includes a display area 301 for viewing the program and sub-views 302 corresponding to users logged into the system who are currently viewing the same program. Sub-views 302 are associated with data objects corresponding to other users, or groups of users, logged into (or registered with) the system who are currently viewing the same program. In some implementations, sub-views 302 may constitute a single sub-view area. In this example, each data object is represented by a user's profile picture. The representation of a data object is referred to as an object element. In some implementations, each object element may be a current video of the user (e.g., from a Web camera) or some non-static object element. In this regard, examples of representations of data objects, namely, object elements, include, but are not limited to the following: pictures, text, images, banners, graphics, sounds files, and videos. Examples of sub-views include, but are not limited to, a portion of an overall view on a display screen, or a defined section of a viewable display screen, which may hold content.

Thus, in the example implementation of FIG. 3, there is a menu, and a display or list of one or more various object elements (e.g., photographs, text, banners etc.). The menu display or list in this example contains scroll-bar functionality 306.

Figure 4:
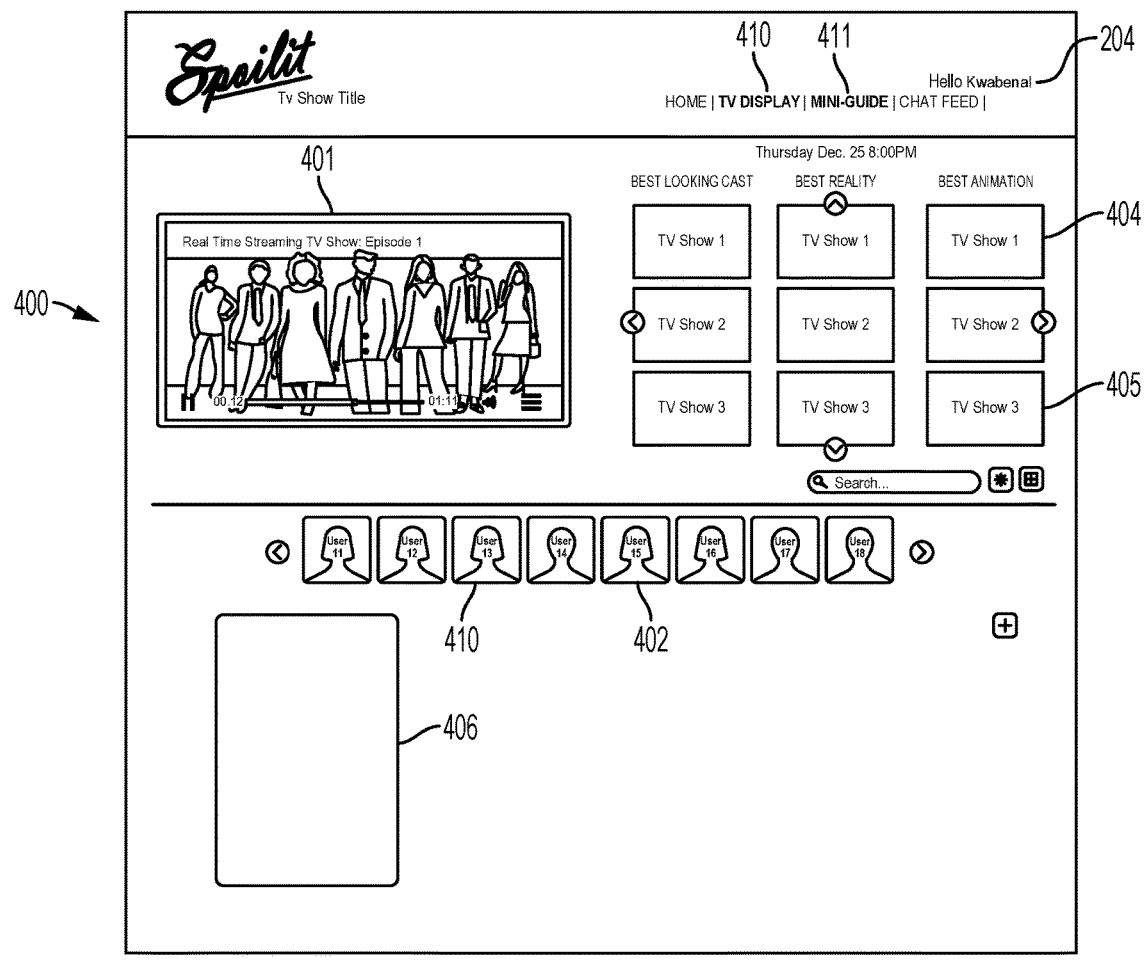
FIG. 4 is a block diagram of an example page for viewing audio-video content, which shows a sub-view area to which a profile picture may be moved.

FIG. 4 shows another example portal, e.g., Web page 400, configured to implement a one-screen viewing experience. In example Web page 400, display area 401 presents the selected program and sub-views 402 correspond to data objects (represented by object elements, which are profile pictures in this example) associated with users logged into the system who are currently viewing the same program (e.g., the program presented in display area 401). Web page 401 includes a selectable menu 404 (in this example implementation, a "mini" program guide) for selecting other programs 405 for viewing. Web page 400 also includes sub-view area 406, which enables interaction between users, as described below. The user may configure, and display, the portal of Web page 400 by selecting "TV DISPLAY" menu option 410 and "MINI-GUIDE" menu option 411 from menu 204.

In some implementations, each data object contains (e.g., stores) data relating to the user represented by a corresponding object element. For example, a data object for object element 410 may contain profile information for the user (e.g., name, age, likes, dislikes, etc.), and data representing, or data representing a link to, one or more chats or other electronic communications in which the user is participating, has participated, has some interest, and so forth. In some implementations, each user may participate in one or more online chat sessions with other users of the system or with other systems. Those chat sessions may be about the program presented in display area 401, or may be initiated in response to viewing the program followed by some user interaction.

In some implementations, data may be embedded and compressed (e.g., serialized) within each data object. For example, in some implementations, the actual data representing a chat session may be stored within a data object. In some implementations, pointers to data may be embedded in and compressed within each data object. For example, pointer(s) to data representing a chat session or other type of information may be stored within a data object. In some implementations, a data object may contain a combination of embedded and compressed data and pointers. To view some, or all, of the information corresponding to that data, a user may drag-and-drop an object element (and thus also a data object associated with the object element) into a sub-view area 406. Dragging-and-dropping the object element also causes the data object to be dragged-and-dropped. In this example implementation, sub-view area 406 is a pre-defined area of the Web page (or other type of portal) having the functionality described below.

In some implementations, each data object (and thus object element) in a sub-view 402 may be associated with one or more data tags or data elements, which may be hidden from view, yet embedded, compressed (e.g., serialized), or referenced within each corresponding data object for later retrieval, expansion, manipulation or other appropriate functions. This first sub-view area functions to keep embedded-data elements hidden from view or compressed within the data object as result of a dynamic interaction between event coding associated with the first sub-view area and event coding associated with the data object/object element. As such, this first sub-view area may also be referred to as "the compression space". In some implementations, event coding may include, but is not limited to, computer-executable code associated with a data object/object element or sub-view, the operation of which may be triggered by on-screen interaction of an object element and sub-view, as described herein.

In some implementations, sub-view area 406 is referred to as a "hot space" because it is located on the user's viewable screen and serves as an electronic key, decompression space, or decompression event that is usable to decompress, unlock (e.g., deserialize), extract, and/or dynamically expand compressed, embedded and/or hidden data in the data object represented by the corresponding object element. In an example implementation, the user drags-and-drops, or clicks, an object element or elements for a corresponding data object(s) (e.g., the user's profile picture, in this example) into the hot space on the display. In response, event-trigger code associated with the data object/object element interacts with event-trigger code associated with the hot space, and this interaction causes expansion of, and display of, information contained in, or referenced by, data tags associated with the data object. Thus, in some implementations, the hot spaces trigger a new view of data when the event trigger code associated with a moved data object/object element(s) and event trigger code associated with the hot space(s) execute in response to interaction of the object element and the hot space (e.g., sub-view).

Figure 5:
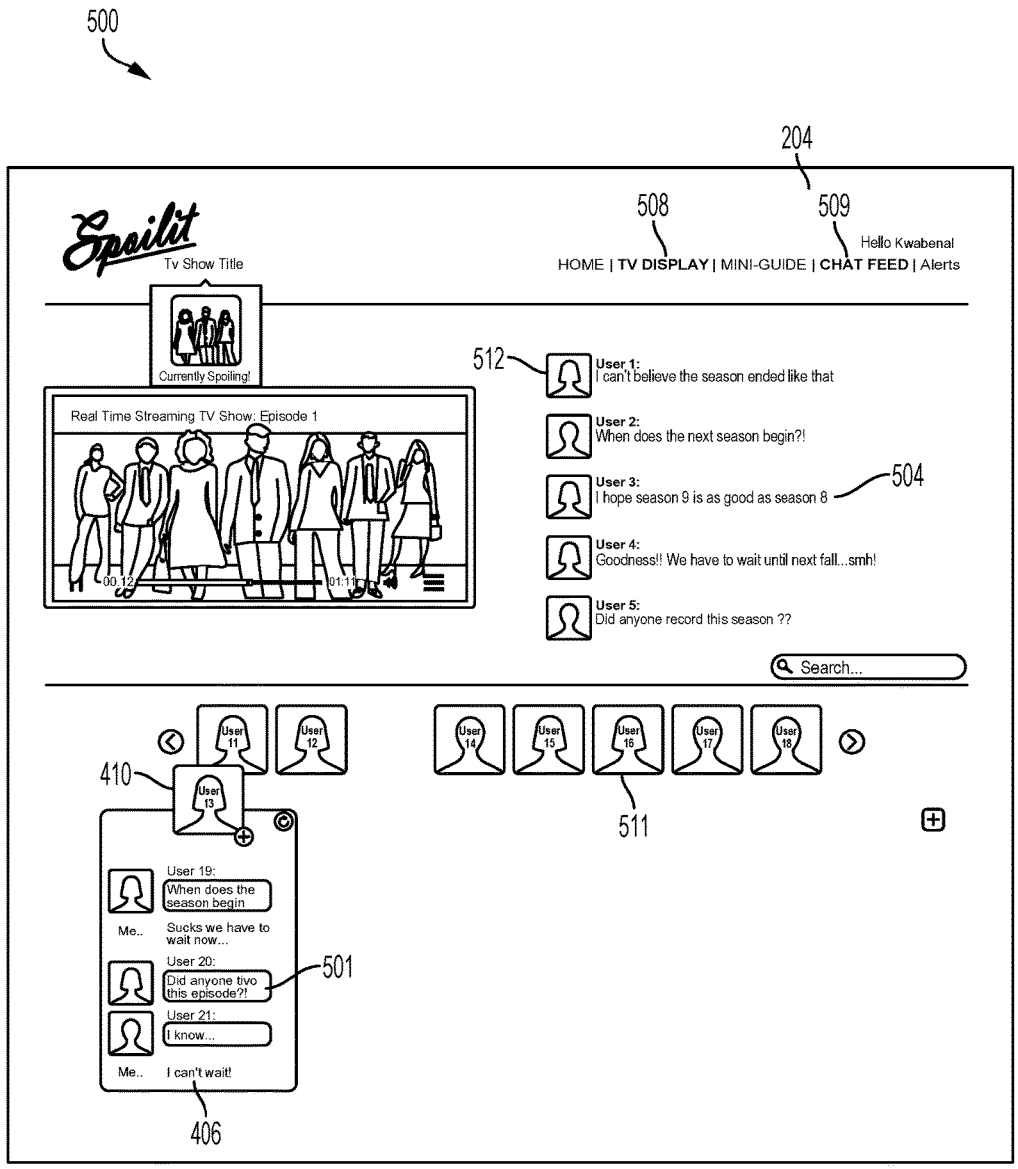
FIG. 5 is a block diagram of an example page for viewing audio-video content, which shows movement of a profile picture to the sub-view area.
Figure 6:
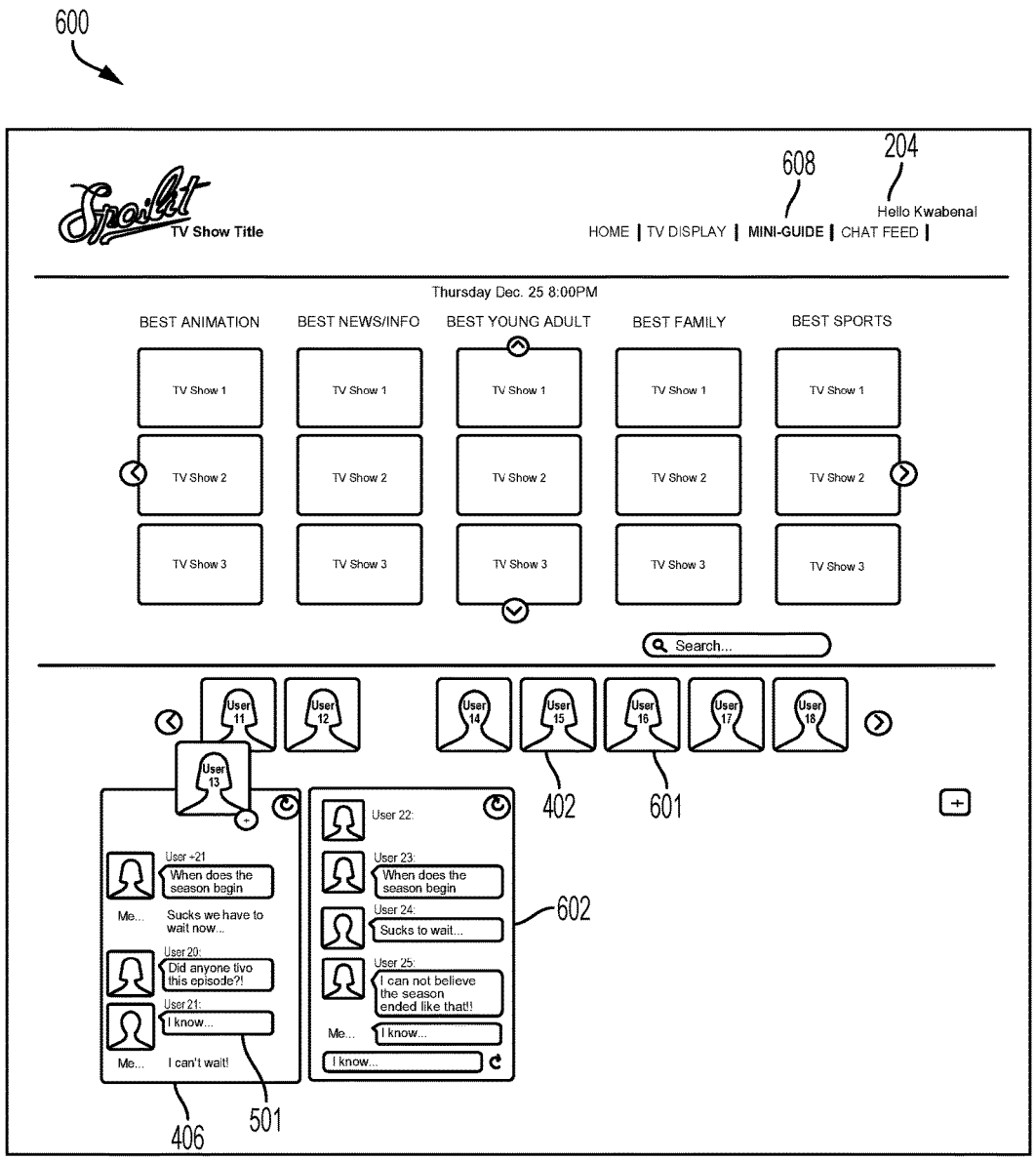
FIG. 6 is a block diagram of an example page for viewing audio-video content, which shows multiple chats in the context of a two-screen experience.

Examples of the foregoing operation are illustrated in FIGS. 5 to 9. In FIG. 5, the user may configure, and display, the portal of Web page 500 by selecting "TV DISPLAY" menu option 508 and "CHAT FEED" menu option 509 from menu 204 (to also display a chat area 504). In FIG. 6, the user may configure, and display, the portal of Web page 600 by selecting "MINI-GUIDE" menu option 608 from menu 204.

Referring to FIG. 5, dragging-and-data object element (e.g., a profile picture) 410, results in expansion and display of data representing a chat session 501 of the corresponding user with one or more other users. In the example of FIG. 5, the user has not yet "dropped" the profile picture and, as a result, the chat session 501 is displayed in shadow form. In this example, event trigger code associated with the data object for object element 410 and sub-view area 406 is able to determine when an object element passes over the sub-view without dropping, in which case data is expanded (e.g., deserialized) and a shadow view is rendered and when the object is dropped, in which case there is a full resolution rendering in the sub-view.

In this regard, data representing the electronic communications may be stored in a data object in association with an object element, such as a profile picture, on a portal. That object element may be moved from one location to another location on the portal. That other location is associated with executable code that may be triggered by executable code associated with the data object/object element. Thus, in the example processes, movement of the object element to the other location triggers execution of code to enable display of the electronic communications at the other location (coincident with display of the content for viewing). The user may further control movement of the object element, as described herein, to control display of the electronic communications.

Also, in Web page 500 of FIG. 5, additional interactions have occurred relative to Web page 400 of FIG. 4 to replace menu 404 with a chat area 504. Chat area 504 may represent chat from all users on the system or from a subset of users on the system selected, e.g., by geography or other criteria. Users for chat area 504 may be filtered by selecting appropriate system settings.

A user may drag-and-drop a profile picture (e.g., 512) into chat area 406. In this example implementation, this action causes executable code associated with the data object and corresponding object element to interact with trigger code associated with chat area 406, resulting in a chat session associated with the profile picture expanding, and being presented as part of, chat area 406. This functionality may be implemented in the same manner as the functionality that results in display of a chat card in sub-view area 406, by dragging object elements 410 or 601, as described below. Furthermore, in some implementations, a profile picture (e.g., picture 512) may have associated therewith data object(s) and functionality of the type associated with profile pictures 511. Accordingly, dragging and dropping such a picture (e.g., picture 512) to sub-view area 406 will result in display of a chat session associated with the user of that picture in sub-view area 406. This functionality may be implemented in the same manner as the functionality that results in display of chat session 501, 602, described below.

FIG. 6 shows a portal, e.g., Web page 600, which may be implemented in a two-screen implementation of the example system. That is, the viewable program is not displayed on the same screen as representations of user objects 601, but rather is displayed on a second screen (e.g., a television screen, which is not shown). In the example of FIG. 6, as is also the case with the one-screen implementation, there may be a different chat session 501, 602 displayed for different users. In some implementations, profile information for the users may be displayed. In this regard, in some implementations, when the user "drops" a profile picture in the sub-view, a chat session 602 is displayed in full resolution.

Dragging a representation of the user data object (e.g., 410 or 601) from sub-view area 406 back to sub-view area 402 causes the information in the data object to be removed from sub-view area 406. The information contained therein may be re-compressed and embedded into the object for later viewing, if desired. Thus, object elements may be moved from a hot space sub-view (e.g., sub-view area 406) back to a decompression space sub-view (e.g., sub-view 402), where a given set of data elements will again become hidden, embedded, and/or compressed. In some implementations, data for a corresponding data object is updated, reserialized, and re-drawn in the sub-view area 402, as described in more detail below. Hiding, embedding and/or compressing may be caused by execution of code associated with the two sub-views in response to on-screen interaction thereof.

Figure 7:
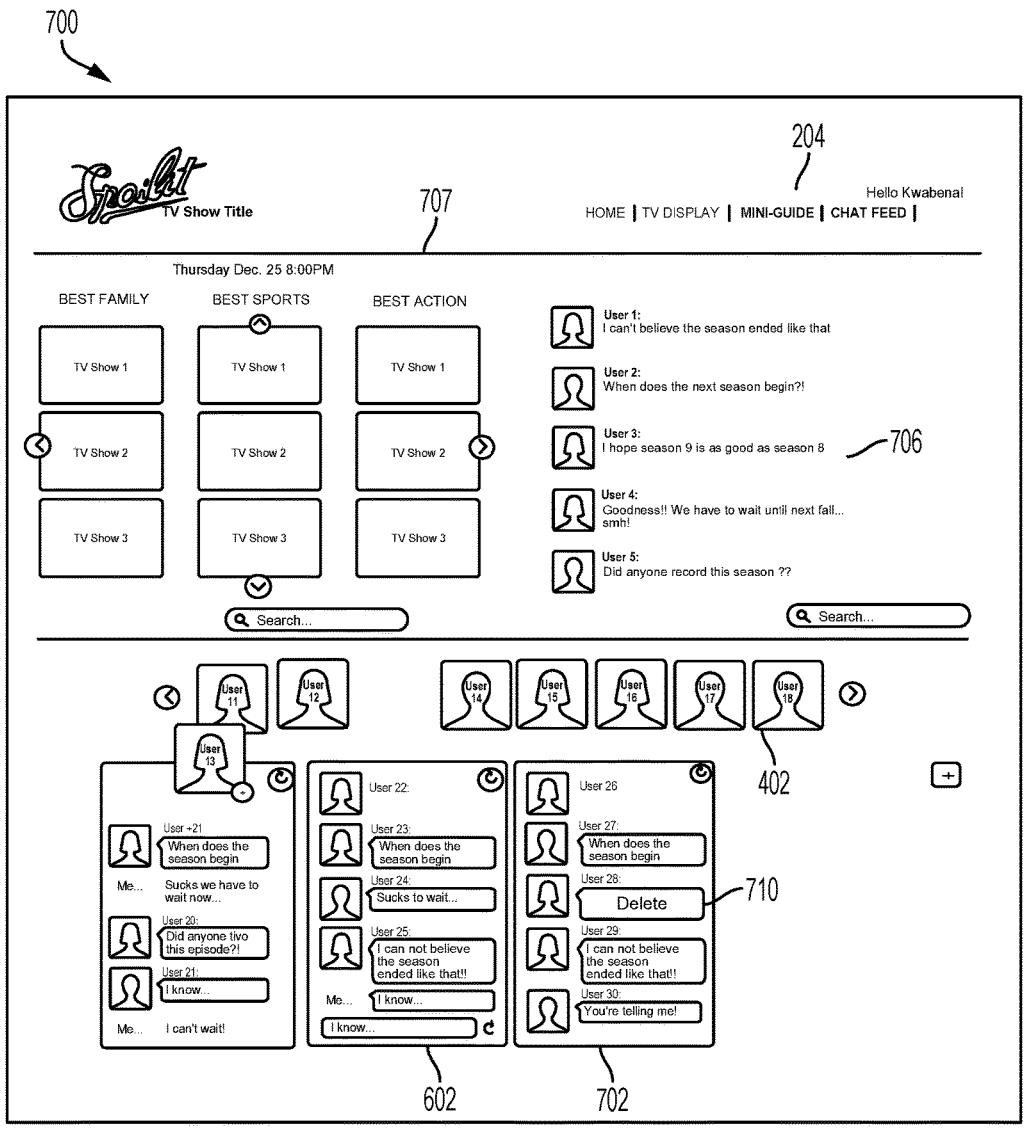
FIG. 7 is a block diagram of an example page for viewing audio-video content, which shows multiple chats and a program guide in the context of a two-screen experience.

FIG. 7 shows a portal, e.g., Web page 700 that may be implemented in a two-screen implementation of the example system. That is, the viewable program is not displayed on the same screen as representations of user objects in area 402, but rather is displayed on a second screen (e.g., a television screen, which is not shown). In the example of FIG. 7, as is also the case with the one-screen implementation, there may be more than one chat session 602,702 displayed for different respective users. In this example, user chat is displayed in area 706 and the electronic program guide (a mini-guide) is displayed in area 707, wherein the object elements are "TV show tiles" (e.g., pictures that represent a given television show in the TV guide or mini-guide). In this example, as shown at option 710, a user may delete a chat session. In this regard, in some implementations, individual chat session displays (e.g., 602, 702) are referred to as "chat cards" and a set of chat cards is referred to as a "chat deck". The user may configure, and display, the portal of Web page 700 by selecting the "MINI-GUIDE" menu option (to also display a mini-guide 707) and "CHAT FEED" menu option from menu 204 (to also display a chat feed 706).

Figure 8:
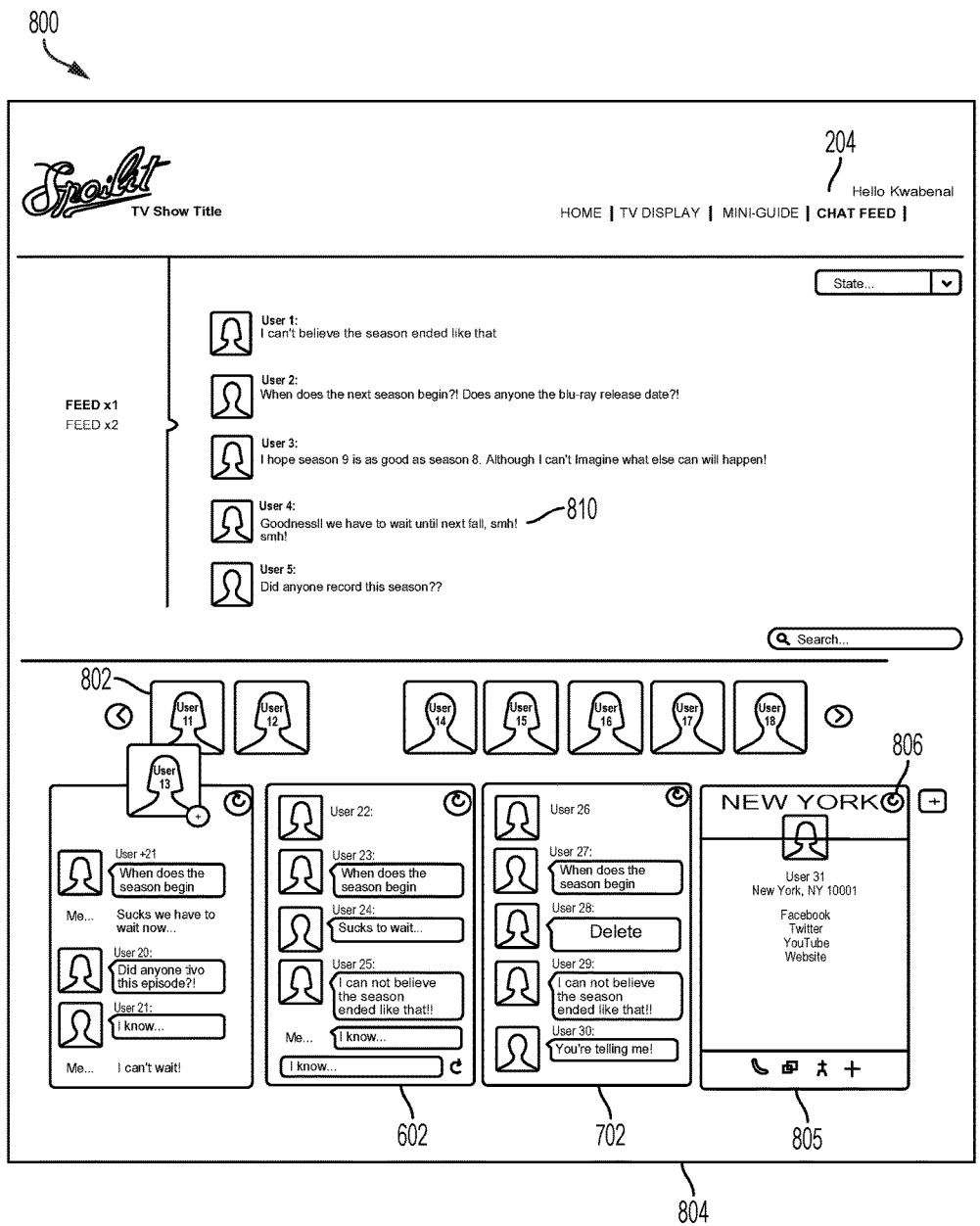
FIG. 8 is a block diagram of an example page for viewing audio-video content, which shows multiple chats and chat feeds in the context of a two-screen experience.

FIG. 8 shows a portal, e.g., Web page 800 that may be implemented in a two-screen implementation of the example system. That is, the viewable program is not displayed on the same screen as representations (object elements) 802 of user objects, but rather is displayed on a second screen (e.g., a television screen, which is not shown). In the example of FIG. 8, four chat cards 804 are shown. In some implementations, a chat card may be "flipped" to display information other than a chat session. For example, in FIG. 8, chat card 805 is flipped (e.g., by clicking on control 806) to display information from the user's profile, here the name and location of the user, along with a list of social networks where the user has accounts. Web page 800 also includes a chat feed 810 relating to a program that users are viewing. The user may configure, and display, the portal of Web page 500 by selecting the "CHAT FEED" menu option from menu 204.

Figure 9:
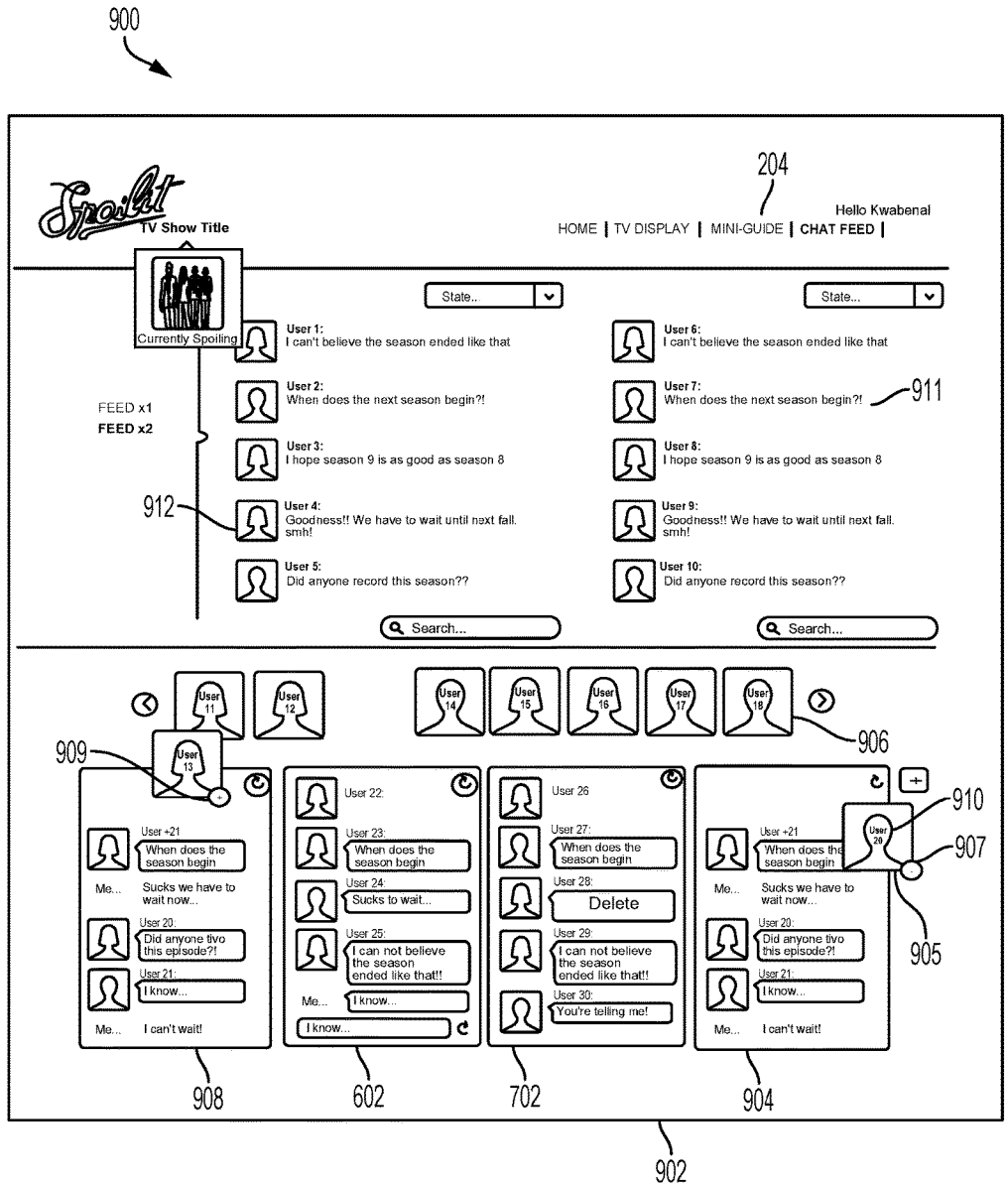
FIG. 9 is a block diagram of an example page for viewing audio-video content, which shows multiple chats and chat feeds in the context of a two-screen experience.

FIG. 9 shows a portal, e.g., Web page 900, which may be implemented in a two-screen implementation of the example system. That is, the viewable program is not displayed on the same screen as representations of user objects, but rather is displayed on a second screen (e.g., a television screen, which is not shown). In the example of FIG. 9, four chat cards 902 are shown. Chat cards 602, 702 are the same as those shown in FIG. 8. Chat card 904 is displayed as well in shadow view because it has been selected for movement from sub-view area 905 to sub-view area 906. Accordingly, chat card 905 is displayed in shadow view, with a "−" sign 907 to indicate that it is being removed from the chat deck (whereas chat card 908 has a "+" sign 909 to indicate that it is being added to chat deck). Chat card 904 remains displayed in shadow form until it is dragged-and-dropped to sub-view area 906. Computer-executable code in sub-view area 906 interacts with computer-executable code associated with the data object represented by object element 910 to re-compress (e.g., reserialize) data into the data object represented by the object element, leaving only the object element (e.g., the representation, such as the user's profile picture) displayed in sub-view area 906, with no corresponding chat card.

FIG. 9 also shows different chat feeds 911, 912 relating to programs that are currently being viewed in the system. These chat feeds may be user-selected, and may be based on users preferences or other information input by the user. The user may configure, and display, the portal of Web page 900 by selecting the "CHAT FEED" menu option from menu 204.

Accordingly, as described above, in some implementations, the user may manage and view different object elements simultaneously by, e.g.: (1) moving object elements back and forth between first and second sub-views, while at the same time (2) interacting with, or viewing, multiple object elements in a given sub-view (e.g., sharing and viewing data with multiple users in the hot space simultaneously); and (3) scrolling through the object elements in each view. Content may be managed between the compression space (e.g., sub-view area 906 of FIG. 9) and the decompression space (e.g., sub-view area 905 of FIG. 9) through use of a hand, finger, cursor, track pad, mouse, or equivalent tactile gestures and/or apparatus, or through automated processes (e.g. computer programs) configured to move one or more object elements to a given sub-view. The user may use a pinch, a click, tap, or series of taps or gestures on one or more of the object element(s) in a sub-view to move one or more object elements into a grouping sub-view that dynamically adjusts to include the new element.

In the example implementations described above, the systems include a dynamic communications portal (e.g., a Web page or other type of interactive user interface) that encourages users to interact, and to view the reactions of their neighbors, while watching broadcast television or other audio-video content. In some implementations, the portal provides users with an opportunity to view the profile pictures of people who are watching a broadcast television show at a given time, and then to select the users for a chat experience.

The example systems described herein may combine functions of (1) drag-and-drop technology, (2) sub-views and data objects associated with a display interface, which are associated with executable event-trigger code, (3) embedding/associating extractable data with(in) data objects, and (4) compressing and decompressing data embedded/associated with(in) data objects upon moving representations associated with the data objects (e.g., the object elements) into a sub-view containing executable event trigger code configured to either compress (e.g., serialize) or decompress (e.g., deserialize) data.

The example systems described herein include various intelligently-coded sub-views that are resident on a display screen, or the functional equivalent of a display screen. The sub-views may be coded in a manner that causes various data object to dynamically expand visible data, contract visible data, reveal hidden/embedded data, and/or hide visible data elements from view as a user moves or drags a representation of the data object from one specially-coded sub-view to another specially-coded sub-view. The executable code associated with the sub-views is referred to herein as "event trigger coding," and variations of that phrase, such as event coding, event trigger(s), and trigger(s).

In some implementations, each sub-view, and corresponding data object representation may be programmed or coded to cause or trigger any one or more of the following functions in response to a user applying a pinch, click, dragging gesture, and/or mouse movement to move an object element from one sub-view into another sub-view: hiding, embedding, compressing, decompressing, expanding, contracting, or revealing data elements that are contained in, or related to, the data objects whose representation is moved into the sub-view.

As shown in FIGS. 2 to 9 above, a viewable display on a laptop, personal digital assistant (PDA), mobile phone, television, or tablet device may be divided into two or more sub-views. The first sub-view (e.g., sub-view area 906) may contain object elements such as profile pictures (e.g., a profile-picture-object element). The profile-picture-object element may contain, or be associated with, one or more embedded, hidden, or compressed data objects that are related to the person in the profile picture (e.g., object-element data). That is, in some implementations, a single object element (e.g., profile picture) may be associated with multiple data objects, each representing different information and each behaving in the manner described herein. Both the first sub-view, and the object element(s) may be associated with distinct, executable event-trigger code that cause the object-element data to remain compressed or embedded so long as the object element(s) remain inside of the first sub-view on the viewable display. The second sub-view (e.g., sub-view area 905) may contains additional executable code that causes or triggers the profile-picture-object element(s) to reveal expanded or decompressed object-element data about the person or subject featured in the profile-picture-object element when the object element is moved by the user from the first sub-view to the second sub-view. The expanded object-element data may include that person's biographical information and micro-blogging activity, among other information or related data. The coding language(s) and protocols that may be used to perform these functions include, but are not limited to, JSON (JavaScript® Object Notation), Javascript®, HTML (HyperText Markup Language), or CSS (Cascading Style Sheets).

In some implementations, the object elements in each sub-view may move or shift slightly to the right and to the left to accommodate the action of the user placing a new object element into the second sub-view for data expansion, or back to the first sub-view for data decompression or re-compression. In addition, the object elements in each sub-view may be programmed to be scrollable menus of object elements that may be simultaneously viewed, manipulated, and interacted therewith. A scroll bar for scrolling through object elements is shown in the figures. Also, an object element that is moved from the first sub-view to the second sub-view is typically no longer displayed in the first sub-view, and vice versa.

In some implementations, users may: view and dynamically scroll through a list of profile pictures of social-media users in the first sub-view, and drag the profile picture(s) into the second sub-view (e.g., a hot space). The hot space (e.g., via code in, e.g., JSON, CSS, Javascript®, and/or HTML) interacts with code associated with the profile-picture-object element(s) and/or corresponding data object(s) to trigger the automatic revelation of expanded or decompressed information regarding the person featured in the profile-picture-object element. Such information may include, e.g., the profiled person's micro-blogging activity and interactions. In some implementations, the hot space is a key that unlocks or expands data that is embedded, hidden, compressed or catalogued, within the object element that is dragged from the first sub-view into the hot space.

In an example implementation, the profile-picture-object elements in the first sub-view are images of people who are all watching the same television broadcast or on-demand video at roughly the same time. In some implementations, the profile-picture-object elements may include only those users with whom the user has a pre-established connection within the system or in an external network.

In some example implementations, profile-picture-object elements may be initially located in the first sub-view, which is positioned at or near the middle of the display screen (e.g., sub-view area 906 of FIG. 9), and which includes a left-to-right-scrollable menu or collage of profile-picture object elements that may be dragged and dropped to the second sub-view in lower half of the screen (e.g., sub-view area 905 of Fig.). When a picture is dragged to the second sub-view in the lower half of the screen, the picture object may be automatically converted (as described herein) into an interface element, such as a chat window, where the user can now chat with the person pictured and view a stream of information about the person pictured, including, e.g., additional pictures of the profiled person and that person's current or previous micro-blogging activity with other social-network users. When a profile-picture-object element is dragged back to the first sub-view area (e.g., from sub-view area 905 to sub-view area 906 of FIG. 9), then the respective event coding associated with the first sub-view and the profile-picture object element(s) will interact to hide, embed, or compress (e.g., serialize), the micro-blogging activity.

In some implementations, hyperlinked news headlines with associated event code may be located in a sub-view at or near the top of the display screen. In some implementations, the sub-view(s) may include a list of available news headlines that may be dragged to a second sub-view as well. When a headline is dragged or clicked to the second sub-view, the headline object element may then be automatically converted to a full news article, e.g., via the interaction between event code contained in a data object represented by the headline (in this example, the object element) and the event code in second sub-view. Next, when the user drags or clicks the article back to the first sub-view, the article text will hide, and only the headline text(s) will remain in the first sub-view, e.g., via the interaction between the event codes contained in the headline and the first sub-view.

Figure 10:
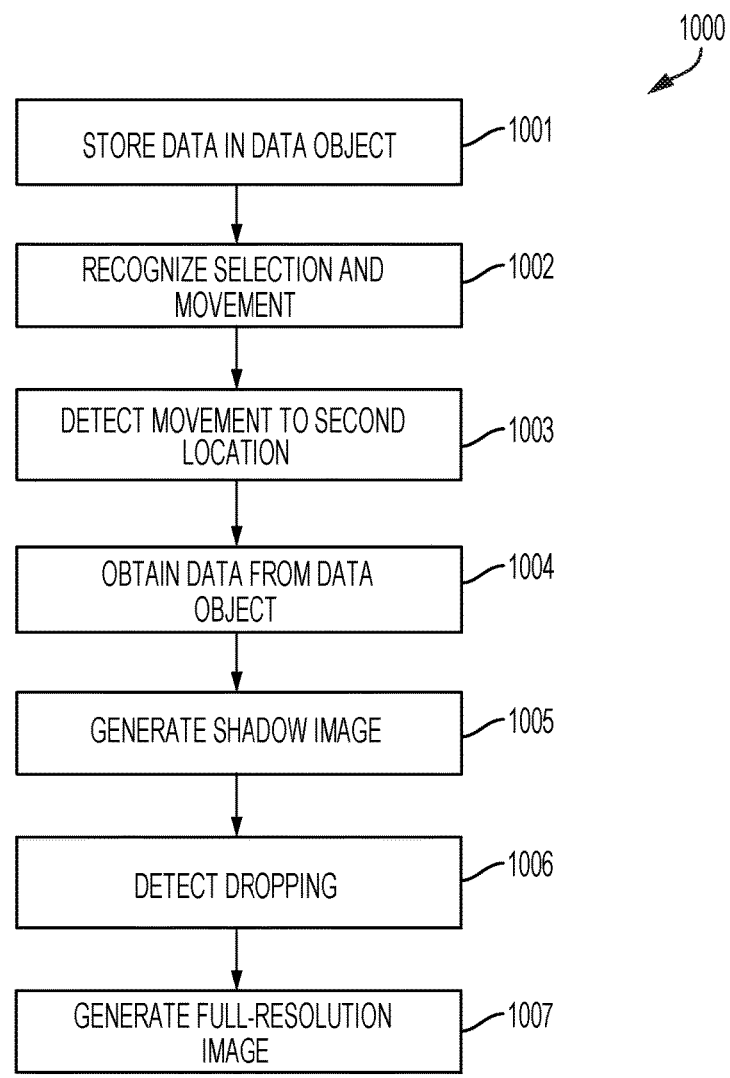
FIG. 10 is a flowchart showing an example process for enabling communication and content viewing.

FIG. 10 is a flowchart showing an example process 1000 for implementing the system described herein for enabling communication and content viewing.

Executable instructions for implementing example process 1000 may be stored on one or more non-transitory machine-readable storage media or devices. Example process 1000 may be implemented by one or more processing devices on a user device (e.g., 104, 105, 106, 107) and/or a server (e.g., 101) by retrieving and executing the instruction to perform the following operations.

According to process 1000, data for various users is stored (1001) in data objects. In some implementations, the data corresponds to electronic communication, such as chat sessions, for a corresponding user. The data may also include profile information for that user including, but not limited to, the profile information described herein. The data object may be a JSON object and the data contained therein may be serialized. Each data object is associated with executable code (e.g., event trigger code) that operates, either alone or in conjunction with other executable code, to perform the functions described herein. The executable code may be stored in the data object, or elsewhere and associated with the data object and the corresponding object element (each data object may be associated with, and represented by, an object element). Examples of object elements include, but are not limited to, those described herein. The object elements are rendered, and displayed in a first sub-view area of a portal (e.g., a Web page), as described above.

Process 1000 recognizes (1002) selection and movement of an object element from a first location (e.g., a first sub-view area 906) to a second location (e.g., a second sub-view area 905) on the portal, which is different from the first location. In this regard, executable code is associated with the data object at the first location. The code is executed in response to detection that the object has been selected (e.g., clicked-on). The code, when executed, generates a temporary container object, in which the data object is stored for "transport" from the first location to the second location. The code, when executed, also redraws the part of the first location that included the object element corresponding to the data object to reflect that the object element has been removed, and continues to redraw the object element on-screen to reflect movement from the first location to the second location.

If the object element does not reach the second location, e.g., it is dropped prior to reaching the second location, code associated with the data object informs a process associated with the first location (which may be implemented by executable code associated with the first location) that there is data from the object that will be transferred to back to the first location. Thereafter, the data is transferred to the process, the process removes the container object, stores the data object in an appropriate location, and redraws the corresponding object element in the first location.

If the object element reaches the second location, process 1000 detects (1003) that the object element has been moved to the second location. In some implementations, reaching the second location may be detected based on an interaction between code executing for the data object and code executing at the second location. Detection may be performed, e.g., by detecting that the object element (e.g., the profile picture) corresponding to the data object has reached a particular part of the display screen. In response to this detection, process 1000 triggers (1004) execution of a function to obtain the data from the corresponding data object. For example data from the data object may be extracted and deserialized. Before the object element is dropped at the second location, process 1000 generates (1005), and renders on-screen at the second location, a shadow image that is based on the data object. For example, the shadow image may be a less-than-full resolution image of the electronic communication (e.g., a chat session) represented by data in the data object. This shadow image is rendered on-screen. An example of a shadow image is, e.g., chat card 908 of FIG. 9.

Process 100 detects (1006) that the object element has been dropped at the second location. This may be done, e.g., by detecting release of a mouse button or other control feature when the object element is determined to be at the second location. In response, process 1000 generates (1007) a full-resolution display image of electronic communication (e.g., a chat session) represented by data in the data object. This full-resolution image is rendered on-screen. An example of a full-resolution image is, e.g., chat card 602 of FIG. 9. As shown in, e.g., FIG. 9, the image (e.g., the chat card) is rendered over at least part of the second location. In other implementations, the image may be rendered elsewhere on-screen, or some other function may be triggered unrelated to image rendering.

As described above, in this example implementation, the interaction of event trigger code associated with the data object and the second location (e.g., sub-view) triggers deserialization of data representing an electronic communication, and display thereof. In some implementations, the data in the data object may be encrypted or stored in a manner that is not serialized. In such implementations, event trigger code associated with the data object and the second location (e.g., sub-view) may trigger decryption of the data and/or any other appropriate type of expansion and display of the data. In some implementations, as described above, the data may represent information other than electronic communications. For example, the data may represent articles or other text, which may be expanded and viewed in the manner described herein. In some implementations, the data may represented one or more pointers to locations containing data representing electronic communications or other information. Those pointers may be deserialized or otherwise accessed and used to obtain the data that is used to generate the displays (chat cards) described herein.

As explained above, a data object may be moved (e.g., by moving its corresponding object element, such as a profile picture) from the second location (e.g., sub-view 905) to the first location (e.g., sub-view 906) to "close" viewing of a chat session. In this case, process 1000 is effectively reversed. For example, code executing in the second location and code associated with the data object detects selection and movement of an object element corresponding data object. In that case, a process is triggered that serializes data from the second location, and stores that data in the data object, which itself is stored in a temporary container object for transport to the first location. Appropriate processes are executed to redraw the part of the second location previously containing the object element, and to draw the object element during motion. The object element is then dropped to the first location, where the data object is removed from the temporary container object and stored in an appropriate location. The object element is then redrawn on-screen at an appropriate area of the first location.

In some implementations, the electronic program guide includes functionality to receive (e.g., via upload), television, movie, or other scripts into the system so that a lexical analysis can be performed on the text of the script. The system may use the uploaded scripts to recognize when a user of the social network, to which the system has access, quotes dialogue from the uploaded script. This information may be used to rank content (e.g., television shows, movies, etc.) in the program guide higher if the dialogue is often quoted by users as they comment about that content on the social network. A premise behind this functionality is that quoting dialogue is generally (e.g., more often than not) a positive reaction to media.

In an example implementation, if the system detects that a user is watching a particular televisions show by reading identifiers (e.g., system IDs) associated with the user's system and television show, and that that user types (illustratively) four or more consecutive words that match four or more consecutive words in the script for the television show that they are watching or have watched, then that show will receive a higher ranking in the program guide than shows that are quoted less often. Ranking processes may take this information into account, and the information may be appropriately weighted in some cases, to determine the ranking. The order of content (e.g., movies, television shows, etc.) may be adjusted based on the ranking.

In more detail, in an example implementation, the system executes computer code (instructions) to determine whether or not words or phrases entered by a user into a social network (or other appropriate online community or forum) to which the system has access, are relevant to determining whether that user might be watching or referring to a particular television program, or referring to an event within a particular program. The system may infer the user's sentiment toward that program or event within the program because the user has entered a quote from that program. For example, the mere fact that a user has entered a quote from content, may indicate a level of familiarity with, and thus popularity of, that content.

In an example, television writers often create characters that use certain catch phrases. Louis Litt, an attorney on the USA production called "Suits" often says, "You just got Litt up". Olivia Pope often says the phrase "it's handled". In a social network (or other appropriate online community or forum) that is about, or can be used for (in part or in whole), discussing content, such as television programming, users often type, micro-blog (e.g., tweet), post, or otherwise publish, the catch phrases or dialogue of characters. This is often a positive sign, as it indicates the user's affection for the character and/or their affinity for the catch phrase or dialogue. In some cases, a character can deliver a one-time-only monologue that resonates with an audience so much that the audience might begin to post, blog, or type aspects of the monologue en masse.

Accordingly, executable code associated with the electronic program guide includes routines for (1) understanding whether content entered (e.g., words typed, voice recognized, and so forth) by a group of users are taken from the dialogue of a show, and (2) measuring how often that dialogue is quoted by users for the purpose of inferring (a) how popular the show is, (b) the popularity of the character(s) that is/are being quoted, and/or (c) how popular the catch phrase is. An ancillary effect of this analysis is that show runners may then use popular quotes more often or include popular characters into scripts more often to improve ratings.

In an example implementation, a system implementing the electronic program guide operates by analyzing hashtables of comments posted about content (for purposes of this explanation, "show") by users of a social network. In this example, each show may have a unique hashtable or set of sub-hashtables. The users of the social network have unique user IDs. Each input from a user may be (1) assigned to the appropriate hashtable related to a particular show, and (2) analyzed, e.g., with natural language or other detection software, to identify phrases, sentences, or other content (e.g., images shared) that are often exchanged among other users posting to that hashtable. In an example, if a particular grouping, pattern, or configuration of words posted by users reaches a specified numerical threshold regarding its usage among all users in that hashtable, then that grouping, pattern, or configuration of words will be identified as "dialogue of interest to viewers". After the dialogue of interest to viewers to flagged, then it can be used as a metric for inferring how popular a show is relative to other shows. For example, a show from which users post, blog or type quotes on a social network may be more popular than shows that are less often quoted. Likewise characters that are quoted more often than others within the same show may be more popular than others, and etc. The same would be true for dialogue regarding commercials or non-video content (e.g., songs).

Shows that are quoted may by displayed on a graphical ranking of shows (e.g., the electronic program guide is ordered according to the relative popularity of shows). Shows are ranked more or less popular depending on how often a given show is quoted relative to other shows. In some implementations, information around the quote or other user input may be analyzed to affect the popularity of content. For example, if a quote is repeated enough times to exceed the threshold, but comments included with the quote (e.g., before or after) are negative, then the popularity ranking of the corresponding show may be affected negatively, and that show's ranking in the electronic program guide may reflect this negativity.

In this regard, in some implementations, the system executes computer code (instructions) to implement example processes to determine, automatically, which parts of speech (noun, pronoun, quotes, subject(s), etc.) that sentiment-word(s) or opinion-word(s) modify in a sentence, or a sentence fragment. This information may be used in the system above to determine, e.g., whether a quote is in a negative context or a positive context. The example processes, however, may be used in contexts other than this, and in contexts other than those presented herein. Although the following describes the processes in the context of sentences, the processes may be used with any appropriate text, including text that is less than a sentence or text that includes several sentences (such as paragraphs).

In an example implementation, the system includes operations to determine which sentiment, adjective, and/or opinion words modify which subjects, nouns, quotes, etc. in text. This may be done, e.g., by performing analyses of grammatical structure of a training set of text (e.g., training set of sentences) to develop rules and to apply these those rules to new text (e.g., a new sentence). For example, in complex sentences, where there are numerous parts of speech and clauses, it can be difficult to determine if a sentiment word, or an opinion word, actually applies to various noun(s), pronoun(s), subject(s), etc. of a sentence. Consider for example the sentence, "Jessica is awful, but Claudia is awesome." In this example, the proper noun "Claudia" is equidistant in words from two sentiment words—"awful" and "awesome." A process used to analyze this sentence for its sentiment about Claudia would need to be sophisticated enough to understand which sentiment word ("awful" or "awesome") modifies which proper noun ("Jessica" or "Claudia"). Simply using the proximity of the sentiment words to the proper noun in this case might cause an imprecise outcome. A mistake could be made if only the polarity of the closest sentiment word were associated with the closest noun. The example processes describe herein (which may, or may not, be part of, or used with, the electronic program guide) are configured to address this situation.

In an example implementation, the processes associate nouns with the proper modifying opinion words by performing operations that include the following. The processes store a database (e.g., a training set) of sentences, in which parts of speech; number of words in text (e.g., a sentence); opinion words; punctuation; and placement of the opinion words, parts of speech, punctuation, are pre-parsed and pre-tagged. This is referred to, in some cases, as a "sentence dictionary". The processes analyze patterns that exist in the training set regarding the placement of sentiment modifiers relative to (a) the nouns and pronouns that they modify, (b) the number of words in the sentence, (c) the order of the various parts of speech in the text (e.g., the sentence), and (d) the placement of punctuation relative to the parts of speech and the opinion words. The example processes record, e.g., in computer memory, patterns that are found in the training set, e.g., "In sentences that are ten words or longer that contain more than one pronoun and more than one opinion word, but only one conjunction, the opinion word that follows the single conjunction modifies the pronoun that follows both the conjunction and the final opinion word in 90 percent of cases". These patterns may be stored in an database of rules that are used to analyze other text. For example, the processes may search for replications of patterns discovered above in new sentences for the purpose predicting which opinion word modifies which nouns, pronouns, or subjects in a new sentence.

Described below is an example of a sentence that is "parsed," by parts of speech, namely: subject, verb, and predicate adjective. In this example, the system includes a control group of sentences, like the one diagramed above ("He is getting old.") and the sentence illustrated first paragraph of this document ("Jessica is awful, but Claudia is awesome."). In some implementations, the dictionary of sentences is stored in computer memory and is be pre-tagged to account for: (1) all of the parts of speech, (2) punctuation, (3) number of words in the sentence, (4) the order of the parts of speech and punctuation, (5) features of a sentence, such as quotes, etc.

In some implementations, the sentence dictionary can be coded with a combination of manual and automated inputs. An automated sentence parser can be used to parse the sentence for parts of speech. An opinion word dictionary can be used to identify and tag all opinion words in the sentence dictionary. The sentences can then be ordered in the hashmap according to whether the parts of speech and the opinion words occur in the same order, e.g., is the subject in the first clause placed before the verb and the predicate adjective placed after the verb. The system will create rules about which parts of speech an opinion word modifies based on the placement of the opinion word relative the structure of the sentence. These rules may be stored in a database, and applied to newly-input text in order to determine the sentiment of users who input that text.

An example implementation of the foregoing process includes the following operations that may be implemented by one or more processing devices executing appropriate computer code (executable instructions). A database stores sentences that are tagged as described above for parts of speech and opinion words. The database stores a dictionary of selected nouns and pronouns that are tagged for their part of speech or other feature, as described above. The database also stores a dictionary of sentiment words, opinion words, and opinion phrases that are tagged for polarity, as described above. In some implementations, the same database may contain all of this information, and in some implementations the information may be in separate databases (in the same or separate memory device).

Relationships between words and clauses in sentences are stored the database. The relationships between words and clauses may be determined according to the following operations. The processes detect and record the distance in words between the subject and the predicate adjective. The processes detect and record the polarity (negative or positive reaction, and the intensity, e.g., weight thereof) of any sentiment adjectives. In this regard, some adjectives may be considered to have more "polarity" than others, e.g., "awful" is considered more intense than "bad". The processes detect and record prepositional phrases and conjunctions, and locations where the prepositional phrases are placed in the relationship to the noun and the predicate adjective, and etc. The processes identify, and record (e.g., store in the sentence dictionary in the database), patterns that exist among sentences with similar known polarities. For example, in a set of example sentences like, "Jessica is awful, but Claudia is awesome," the processes may determine find that every time a sentence has two nouns, two sentiment words, a comma, and conjunction, then the second sentiment word has a 95% chance of applying to the noun that follows the comma and the conjunction. These patterns constitute rules against which newly-input text may be compared to determine the sentiment of content in that text (e.g., whether a user is positively or negatively commenting on content of the text). This information may be used to determine a user's sentiment with respect to programming and, the resulting sentiment, may be used to affect ordering of programming in the electronic program guide described herein. For example, the sentiment may be associated with the programming and, in some cases, if more than a threshold number of users have that sentiment, the electronic programming guide may be reordered accordingly. An example of this is described above with respect to quotations; however, the example processes may analyze any text to determine sentiment and to rank programming accordingly. In some implementations, the system may be able to identify a particular user's sentiment based on communications to/from that user, and tailor the ordering in the electronic program guide to that user. Other uses are also possible.

For a newly-input sentence or other text (e.g., entered into a social network to which the electronic program guide has access), the processes apply rules from the database to determine sentiment expressed by the text with respect to one or more features (e.g., a subject, such as a television show or movie, or a quotation) identified in the text. For example, the processes may compare new sentences to sentence database of known polarities and mapped sentence structures. When a new sentence has a structure that is similar or identical to a sentence in the dictionary, the processes may assign a predicted polarity based on information determined about the sentence based on application of appropriate rule(s). For example, if a user has quoted text from a movie, such as "I'll be back", but has included additional content such as "is the stupidest quote I've ever heard", the system may determine that the user did not like "The Terminator" movie, and that determination may negatively impact display of that movie on the user's electronic program guide (e.g., it may be displayed in a lower slot).

Identifying Users with Whom to Interact

Described herein is an example interactive video system that enables viewers (also referred to as users) to watch video (e.g., a television program) online. In some examples, the video may be viewed on a computing device, and may be accessed via a data steam from a cable or other video provider. The data stream may be in Internet Protocol (IP), Real Time Control Protocol (RTCP), MPEG, or any other appropriate data format. The example system may identify which viewers are watching which video channels, and automatically or manually group viewers who are watching the same channel in an interactive portal (as shown, e.g., in FIG. 4). Through that portal, a viewer can select one or more other viewers for interaction. For example, the viewers may participate in a chat session about a program that they are all viewing at the same time.

In example implementations, the users whose graphical objects (e.g., 410) are displayed, e.g., in FIGS. 3 to 9, are identified by an interactive video system, such as that shown in FIG. 1, using an example process that includes the following operations: (1) storing, in computer memory, a profile of a user of the interactive video system, where the profile comprises identifying information for the user, and at least some of the identifying information is unique to the user; (2) receiving, by one or more processing devices, a selection from a computing device of the user to watch a channel of video that is available through the interactive video system, where the selection is identifiable as being from the user; (3) adding, by one or more processing devices and based on the selection, at least some of the identifying information to a data structure stored in computer memory, where the data structure associates the at least some identifying information with the channel of video corresponding to the selection; (4) identifying, by one or more processing devices and based on the data structure, a group of users, such as users represented by sub-views 402 of FIG. 4, which includes the user, who are watching the channel of video during a same time period; (5) generating, by one more processing devices, data representing graphical objects associated with the users in the group who are watching the channel of video during the same time period and are available to interact via the interactive video system; and (6) outputting the data to the video device of the user to enable rendering the graphical objects on a display screen of the video device. Users can select the images, and manipulate the images on-screen as described herein, to interact online with other users.

In example implementations, the interactive video system is implemented on one or more servers or other computing devices, and is accessed via a computing device, such as a computer or smartphone. In an example, the interactive video system streams, to the user's video device (e.g., a computing or other device), a coded signal containing video, such as a television program, originating from a video provider, such as a cable provider, a satellite provider, or an Internet television provider. In some examples, the interactive video system may use Web socket technology to perform the streaming. For example, the system may establish a Web socket, for each channel of programming, between the video provider and the user's video device, between the video provider and the system's server(s), and/or between the system's server(s) and the user's video device. So, in some implementations, video may be streamed directly from the video provider to the user's video device. In some implementations, the video may be streamed from the video provider, to the system's server(s), and then from the system's server(s) to the user's video device. In some implementations, the video may be downloaded and cached on the system's servers, and then streamed from the system's servers to the user's video device via an appropriate Web socket.

The system may generate the coded signal by converting, in real-time, the signal, e.g., from MPEG-2 format (or whatever video format is used by a given broadcaster) to VP8 (WebM), HTML-5, or any other format suitable for online/web-based video streaming. In some examples, the interactive video system automatically associates or embeds a video stream with one or more data tags. Examples of data that may be included in the data tags include, but are not limited to, Web socket identifiers (IDs), socket pointer IDs, voluntarily-provided user-profile information, voluntarily-provided user demographic data, and so forth. The data tags are received by the user's computing device, and are stored in a list or object on the user's computing device or other appropriate storage device that is accessible to the user's computing device.

In some examples, the interactive video system maintains a list of channels of television programs that are broadcast at a given time. The system also stores unique user identifier (IDs), which can be any appropriate type of information that uniquely represents a user. The user IDs may be stored in a list map or other appropriate data structure that correlates the user IDs to channels (or programs) that the users are currently watching or have selected. In this example, information identifying a user and channel (or program) that the user has selected via the electronic program guide is received from the user's computing device. The interactive video system identifies all users whose IDs are in the same list map (or other structure), and incorporates graphical objects corresponding to those users into a user interface displayed on the user's video device. The user interface includes a menu or sub-views (e.g., the sub-views of FIG. 4), from which users can be selected by other users for interaction, such as an online chat experience. The system may maintain a count of all identifiers (IDs) in the same list map or other structure for the purpose of maintaining statistics and generating graphical displays regarding viewership numbers and patterns.

Figure 11:
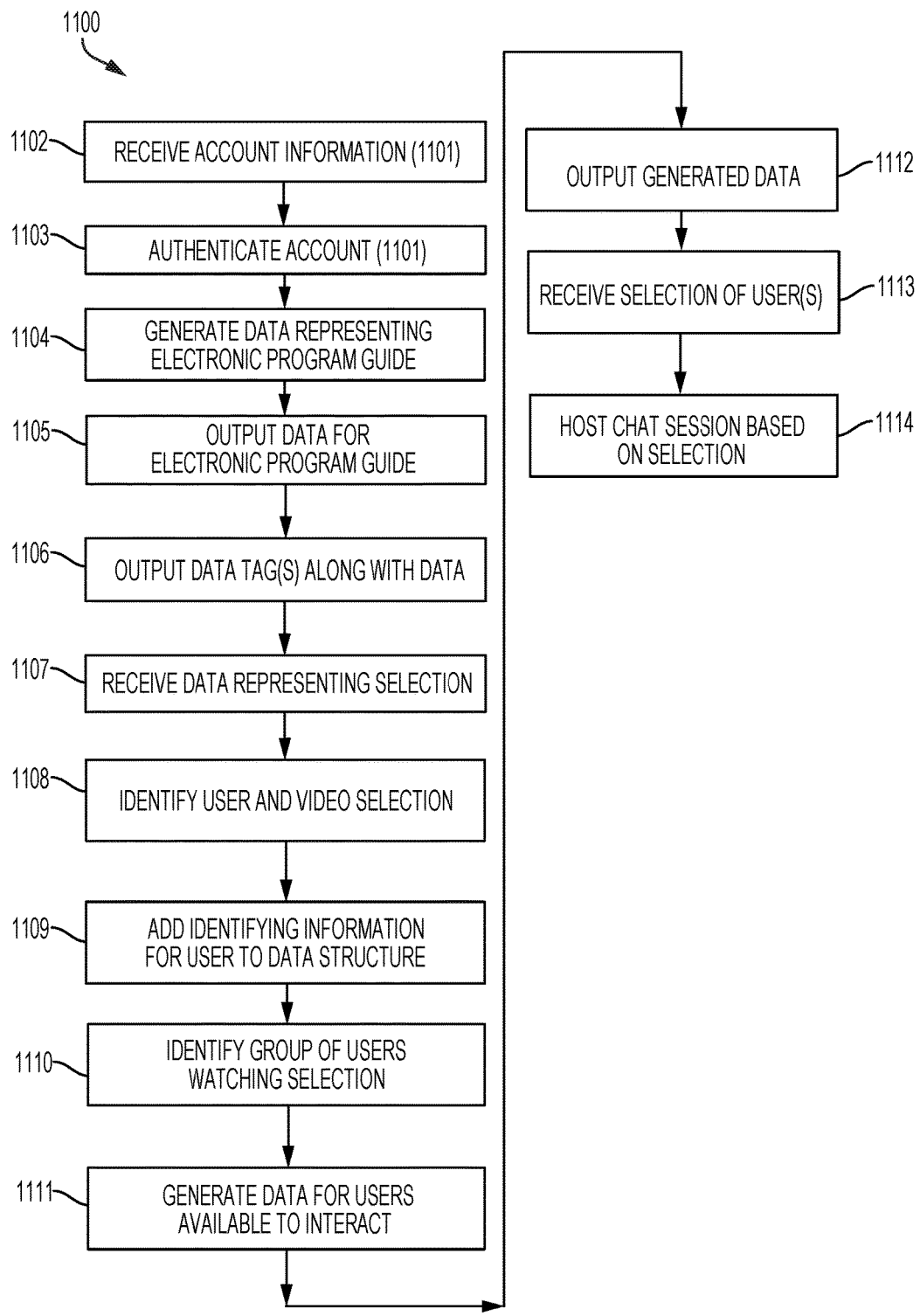
FIG. 11 is a flowchart showing an example process for selecting viewers for interaction, such as chat.

FIG. 11 is a flowchart showing an example process 1100 for enabling interaction among users of an interactive video system, such as the interactive video system described with respect to FIGS. 1 to 10. In an example implementation, the interactive video system, and some or all of the operations performed by process 1100 are implemented by code 110 executing one or more processing devices of server(s) 101. In some implementations, some or all of the operations may be distributed among different servers or among client and server devices, where the client, in some examples, is the device to which video is served.

Set-up phase 1101 of process 1100 allows a user to register with, and thereby use the features of, the example interactive video system described herein. The set-up phase need not be repeated; however, it may be repeated under appropriate circumstances. Furthermore, some or all of the operations of the set-up phase may be eliminated or substituted with other appropriate types of registration.

In this example, process 1100 receives (1102) account information from the computing device of the user. Example computing devices are described herein and include, but are not limited to, desktop or laptop computers, smartphones, smart televisions, and so forth. The account information identifies an account of the user for a video provider, such as a cable or satellite service. The account information may include, e.g., the user's name, address, account number, and the like. This information can be used, by process 1100, to interact with the user's video provider and to access content therefrom, with appropriate permission of the user (which the user may provide directly to the video provider or through the interactive video service). Process 1100 authenticates (1103) the account of the user based on at least some of the account information. For example, process 1100 may communicate the account information to the video provider and, with appropriate user permission in place, confirm that the user has an account with the video provider and that the video provider is permitted to provide audio/video content to the interactive video service.

Assuming that authentication is successful, process 1100 may open a network connection to enable streaming of data for one or more channels of video from the video provider to the video device of the user. In some cases, the video device of the user is the same device (e.g., a computer) with which the user interacts with the electronic program guide (e.g., as shown in the implementation of FIG. 4). In some cases, the video device of the user is a different device (e.g., a television) than the device (e.g., a computer) with which the user interacts with the electronic program guide (e.g., as shown in the implementation of FIG. 6). In either case, the network connection may be established using one or more Web sockets. For example, as described above, process 1100 may establish a Web socket connection between or through the one or more servers hosting the interactive video service and the video device of the user. In some implementations, there may be a Web socket connection established for each channel of video that is to be streamed to the user's video device. As a different channel is streamed, that Web socket connection may be torn-down, and a new Web socket connection may be established. In some implementations, each Web socket, as it is established, is associated with a Web socket identifier that is unique to the user. In some examples, this may be a numerical or alphanumerical identifier. Each Web socket may also contain its own unique identifier, such as an address or the like, that distinguishes the Web socket from other Web sockets.

In some implementations, the system may maintain statistics in a cache or database regarding the aggregate number of Web socket identifiers generated by the system at a given time and/or in a given region of the world. The statistics may be used to track the number of users who are watching a particular broadcast. A purpose for maintaining a cache or database of statistics is to supply data for graphical outputs (including television program guides) that summarize viewership information and patterns.

Process 1100 generates (1104) data representing an electronic program guide, such as electronic program guide 200 shown in FIG. 2 or other versions depicted in the figures. In other implementations, the electronic program guide may look differently and behave differently than those shown in the figures. The electronic program guide may present one or display graphical elements corresponding to different channels of video. For example, the graphical elements may be images, icons, video clips, text, or any other appropriate information identifying the content (e.g., television program, movie, Internet video clip, or the like) of a channel available through the electronic program guide. Process 1100 outputs (1105) the data for the electronic program guide to the video device of the user. In this example, the data is output over a Web socket connection. The data may be used to render the electronic program guide, and the variants thereof shown, e.g., in FIG. 2, 4, 6, or 7, on the display screen of the user's video device.

Process 1100 stores in computer memory (e.g., in memory 109 of FIG. 1), profiles of users of the interactive video system. This operation may occur at any appropriate point in, or before, process 1100. In some implementations, the profiles include identifying information for the user, at least some of which may be unique to the user. In some implementations, the identifying information may include, but is not limited to, one or more the following: an authentication key associated with the user (e.g., an authentication key by which the user accesses the system), an authentication key identifier associated with the user, a Web socket address or identifier therefor associated with the user, a Web socket pointer or other identifier therefor associated with the user, a user profile number, a network address associated with the user, and/or other appropriate identifying information. The identifying information may be obtained from the user, or from the user's computing device at the time that the user registers with the interactive video system or during interaction between the user's computing device and the system. The identifying information in the profile may be used, as described below, to associate a channel with a user during a period of time.

Along with the data output to the user's computing device representing the electronic program guide, process 1100 may output (1106) one or more data tags associated with the graphical elements (representing channels or programs) of the electronic program guide. The data tags may include information from the user's profile, and may be user-specific. The data tags may be stored, e.g., in memory in a data structure, list, or other appropriate construct on the user's computing device. One or more of these data tags may be sent to the interactive video system, along with data representing selection of a channel from the electronic program guide. As described below, a request for video content may include a data tag that is specific to the user making the request. That data tag enables the interactive video system to identify the user and to access other information in the user's profile.

More specifically, to access a channel on the electronic program guide, and thereby view video programming contained therein, a user may select a graphical element (e.g., object element 201 of FIG. 2) of the electronic program guide via the user's computing device. This selection may be made, e.g., by pointing and clicking on the image, by selecting the image through a virtual keyboard provided by the interactive video system, or by any other appropriate mechanism. In response to the selection, the user's computing device sends data representing a request for video content to the interactive video system (e.g., to process 1100 running as part of that system). The request also includes one or more data tags(s) stored on the user's computing device via the interactive video system.

Process 1100 receives (1107), the data representing the selection from the user's computing device, along with one or more data tags that are sent along with the data representing the selection. The one or more data tags identify the user, and are appended to the request, or otherwise associated therewith. The selection indicates the user's intent to watch a channel of video, including real-time television broadcasts, through the interactive video system. The request is identifiable to process 1100 as being from the user based on the data tag(s) included with the request.

Process 1100 identifies the data tag(s) received in the request. Based on the identity of the data tag(s) and information in the selection data, process 1100 determines (1108) the identity of the user and of the selected channel of video. Process 1100 may use the identity of the user to access (with appropriate permission), the user's profile to obtain additional identifying information about the user. For example, the obtained identifying information may include the user's name, username, moniker, or other appropriate identifying information from the user's profile. Process 1100 adds (1109) at least some of the identifying information to a data structure stored, e.g., in computer memory 109, that associates at least some identifying information with the selected channel of video. For example, the user's name may be stored in a data structure identifying all users of the interactive video system who are watching the user-selected channel of video at the same time. Any appropriate data structure or other construct for associating users with channels may be used. In some examples, the data structure may include a linked list, a lookup table, a hashmap, or combination thereof which associates users with channels of video that the users are viewing during a period of time period (e.g., when the initial user selected the channel for viewing).

Process 1100 identifies (1110) based on the data structure, a group of users, including the user who made the selection, who are watching the selected channel of video at the time that the user made the selection. For example, process 1100 may retrieve the identities of the users and the identity of the channel that was selected. Process 1100 may retrieve information about the channel, e.g., from a video feed provided by the video provider or elsewhere. The information may include information about the program to be presented, such as cast, reviews, information about other episodes and so forth. Process 1100 may make this information available through the electronic program guide in response to the selection.

Process 1100 may also retrieve information about the other users who are currently viewing the channel selected by the user. This information may be retrieved, e.g., from the other users' profiles. The information may include, e.g., other users' names, usernames, monikers, or other appropriate identifying information from the other users profile. The information may also include, e.g., an image, icon, logo, or other graphical object for each of the other users. Where no such graphical object is available for another user, then process 1100 may determine that no such graphical object is available, and select and retrieve a generic graphical object for the user. In some implementations, the same generic graphical object is used for each other user. In some implementations, different generic graphical objects are used for different users.

Process 1100 may also determine which of the other users are available to interact. In an example implementation, the interaction may be online chat; however, the system is not limited to chat interactions. For example, other types of interactions, such as video conferencing, teleconferencing, in-person meetings, and the like, may be implemented or facilitated by the system. Process 1100 may identify which users are available to interact based simply on whether those users are viewing the same video as the user who made the selection. For example, in some implementations, each user who participates in the interactive video system implicitly consents to interact whenever they are watching a video through the interactive video system. In some implementations, users may control whether and/or when they interact with other users while viewing a video through the interactive video system. For example in some implementations, each user may provide an indication, e.g., through a user interface or through a user's profile, that the user is available to interact. The system may determine that the user is available to interact based on this indication.

Process 1100 generates (1111) data representing images associated with the users in the group who are watching the channel of video during the same time period and who are available to interact via the interactive video system. Process 1100 may identify those users based on the data structure described above, and may identify which of those users who are available to interact as described above. In an example, the data may represent, e.g., the names or other identifying information of those users and the graphical objects (e.g., images) associated with those users.

Process 1100 outputs (1112) the generated data to the video device of the user to enable rendering the images on a display screen of the video device. For example, the user's video device may use the data to render a user interface, such as those shown in FIGS. 3 to 9, which includes users who are currently watching a selected video and who are available to interact with the user who made the selection. In some implementations, data for the interactive user interface (e.g., FIG. 6) is provided to a first user device, such as the user's computer, and data for the actual video is provided to a second user device, such as the user's television. In some implementations (e.g., FIG. 5), data for the interactive user interface and the video is provided to a single user device, such as the user's computer. In any case, the received data is used to render appropriate visual content.

Following rendering of the user interface, the user who made the selection may select one or more other viewers with whom to interact. In some implementations, this is done in the manner described with respect to FIGS. 3 to 9. For example, the user may drag-and-drop a graphical object corresponding to one user to a chat area, thereby enabling chat with the user corresponding to the graphical object.

To this end, process 1100 receives (1113) a selection, from the computing device (or other device) of the user, of a graphical object corresponding to a different user available to interact via the interactive video system. The selection may include the dragging-and-dropping described above, or any other appropriate type of selection. Responsive to the selection, process 1100 hosts (1114) a chat session between at least the user and the different user. The hosing may include, e.g., generating data representing the chat session, and outputting the data representing the chat session to the computing device of the user and to a computing device of the different user. The data is updated over time as new user input, such as text, images, etc., and that data is provided to a chat window. In example implementations, the data representing the chat sessions may be used to render graphical elements, such as the chat cards and/or chat areas described above, e.g., in FIGS. 4 to 9.

Example process 1100 may be used to generate data to render any appropriate graphical interface including, but not limited to, those show in FIGS. 2 to 9.

Accordingly, described herein is are examples of systems for integrating (a) the selection and viewing of a television program or other video online or wirelessly with (b) a social media environment that automatically groups together users who are watching the same television program or other video in real-time so that those users can chat together about what they are all watching.

In a specific example implementation, the system (a) translates a user's cable signal to a signal that is suitable for online streaming and viewing, (b) indexes, in a hashmap, information about users who are watching a particular program, and (c) then groups users together for potential chat experiences. In an example, the system is implemented using one or more computing devices, Web-enabled televisions, mobile devices, tablet computing systems, or the like.

In this example, the user uploads and/or saves, into the system, via voice, keypad, or other input device, information regarding the user's cable (or other video) provider and cable account information. The system communicates with the cable provider to authenticate the user's cable account. Successful authentication enables (a) the system to initiate an Internet protocol connection (socket) to the user's cable provider, and (b) to upgrade a current user device Web socket connection for streaming. So long the user's socket connection is open, the connection to the broadcaster will be maintained.

In this example, the system provides a translated video feed from one or more Web sockets to the user's computing device, while simultaneously translating the cable signal from MPEG 2 (or the video format used by a given broadcaster) to VP8, (or any other format suitable for online/web-based video streaming). Real-time conversion of the signal may be performed using appropriate transceiver technologies. The system may maintain a count of the number of video signals converted (e.g., the number of signals converted per show) and display these statistics in various graphical representations, including a television program guide. When the user changes the channel (e.g., selects a new program for viewing), the system will switch the content of the video data that is already streaming by closing the current Web socket connection and opening a new Web socket with the proper metadata of the new channel. This will cause a new socket connection to the broadcaster to be established. The user may change the channel by, illustratively, selecting a program from an electronic program guide, from a list of programs, or with a numbered keypad that appears on the system . . . .

In this example, the system maintains a profile for each user. The user profile may include, e.g., one or more of the following: (a) the user's authentication key, (b) an authentication key ID number, (c) Web socket & Web socket ID number, (d) socket pointer & socket pointer ID number, (e) a user profile number, and/or (f) or other Internet Protocols or addresses that may be used to identify the user.

In this example, the system stores a linked list. The linked list may be divided into hashmap and/or hashtable according to the television programs that are available for viewing. Each television show may have its own hashmap. In this regard, a hashmap may also be a linked list or contain a representation of a link to another hashmap, hashtable container, or a group of related sub-hashmaps, sub-hashtables maps, or the technological equivalent. When the user clicks on a channel to watch in the electronic program guide, the system adds an identifier (ID) (for example a JSON object that represents the user, or any graphical or non-graphical object that represents the user) to the list of users who have selected and/or are watching that channel. The identifier may also be added to other related linked lists, hashmaps, or hashtables, that organize and contain users who are viewing the same video. When the user clicks on a channel, or switches channels, the system will add the user's data tag(s), Web socket ID(s), authentication key ID(s), and/or socket pointer ID(s) to the hashmap(s) or table(s) and/or related linked list of the new show that the user is watching.

In this example, all users in a particular linked list are presented, graphically, to other user(s) in the linked list as available to chat about the television program that they are all watching, or have selected. In this example, all of the users or a portion of users in a given linked list, are represented by profile picture object elements or name object elements on the system's user interface.

In some examples, the system operates independently of the video streaming described above. For example, a user can select a program that they would like to chat about from the electronic program, and watch that selected show on, e.g., their conventional-living room television, instead of on the disclosed system. In this example, user's profile is still integrated into the chat system with other users who are watching the same program either on the system or via television. The user may thus be able to chat with those other users in the manner described herein using an appropriate computing device, while watching the video on their conventional television.

In some implementations, the video feed is provided by the video provider to the user's television. Users may select to interact about the video in the manner described above without selecting the video to view through the system. Rather, the video may be selected through (A) a program guide provided by the video provider, such as a digital cable television program guide provided by a cable provider, (B) a program guide generated by the system itself with licensed television program-guide data, and/or (C) a program-guide where video offerings are ordered and displayed dynamically according to statistics maintained by the system—the statistics may include the number of unique IDs created by the system in response to a user's request to view a particular show, the number of Web socket identifiers that relate to a particular show, authentication keys associated with users, converted signals that relate to a particular show, and other IDs referenced in this description. In example "C", object elements representing television shows or videos that have the greatest number of associated user IDs would appear at the top of the program guide, thereby allowing users to select a show with the greatest number of potential chat partners.

Alternatively, the object elements in area 707 (the TV show tiles) might, illustratively, represent different groups of users who are logged into the system as currently watching one or more of the various shows pictured in those TV show tiles. For example, in area 707, the object element labeled "TV show 1" under a category "Best Action," could correspond to a hashmap of all users, or a sub-group of users, watching and/or commenting about TV show 1 in the category Best Action. That TV show tile could be dragged or clicked from area 707 by a user to area 706; then, when the TV show tile reaches (or is clicked to) area 706 the event trigger code associated with area 706 would, illustratively, decompress into a feed of comments (depicted in area 706) from all users, or sub-groups of users, watching TV show 1 in the category of Best Action.

Dynamic Online Periodical

All or some of the processes described herein may be applicable outside of the context of an electronic program guide and/or may be applicable to features that may be used with the electronic program guide. For example, at least some of the processes may be applicable to a dynamic online periodical, such as an online newspaper, magazine, or the like. In some implementations, an example dynamic online periodical includes articles that change based on factors such as television programs that are currently airing on television, and information that is trending on social media about television. In this context, the word article includes, but is not limited to, any type of information that can be included in an online document, such as text, video, audio, multimedia, or the like. Information about television, such as whether a program is trending, may be based as analytics obtained from a social network in which users discuss what they are watching in real-time. In the example dynamic online periodical, articles may include links that allow users to, e.g., click-through to real-time streaming television broadcasts that relate to content in the article, click-through to discussion portals about the real-time broadcasts, and so forth.

Figure 12:
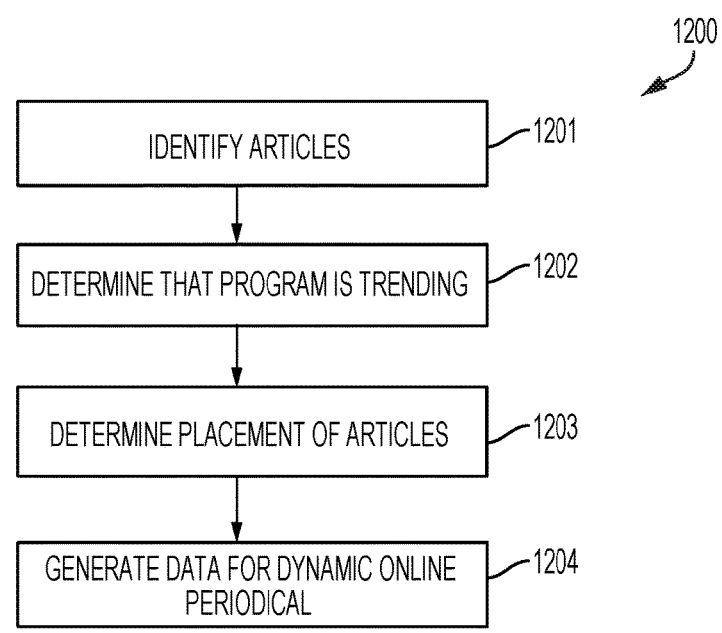
FIG. 12 is an example process for generating a dynamic online periodical.

In an example implementation, which articles are included in the dynamic online periodical changes based on what programs are currently on television and based on the popularity of those programs as measured, e.g., by social media activity, ratings, a combination thereof, or any other appropriate metric. In this regard, any appropriate process or information described herein for ordering programs in the electronic program guide may be used to order articles in the dynamic online periodical. In an example, at a first time, the dynamic online periodical may include articles A, B, and C; at a second time, the dynamic online periodical may include articles A, B, and D; at a third time, the dynamic online periodical may include articles E, F, and G; and so forth. The systems described herein have access to television programs and information relating to those television programs, and are able to use that access to change which articles are included the dynamic online periodical automatically and in real-time. The change of articles may be similar to that described above with respect to the electronic programming guide. For example, articles relating to programs that are popular may be scored and, based on those scores, ranked higher, and therefore displayed at preferred positions in the dynamic online periodical. FIG. 12 shows an example process that may be used to generate data that may be used to render, and update, the dynamic online periodical.

According to process 1200, articles are identified (1201) for inclusion in the dynamic online periodical. In an example implementation, the articles include, but are not limited to, electronic articles coded in HTML format or another language suitable to display and organize online written content. The articles may also include images (e.g., JPEG, PDF, and so forth), audio (e.g., MP3), video (e.g., MP4, MV4, and so forth), multimedia content, and any other content that is available and appropriate for inclusion in a dynamic online periodical.

Articles that may be included in the dynamic online periodical may be tagged either automatically, e.g., through natural language recognition protocols, and/or by an editor. Examples of descriptive tags that may be used include electronic signatures that index a subject of the article (e.g., the actor and/or television shows that the article is about). In this example, the tags may include data from, or derived from, the electronic television program guide; however, this is not a requirement.

A first index is generated, and stored in memory, to associate, with descriptive tags, information about the articles, such as the subject matter of the articles, the sources of the articles, and so forth. The information may be stored in look-up tables, lists, or any other appropriate construct. In some implementations, content management systems, such as OpenPublish, may store articles that are accessible to process 1200, and that can be incorporated into the dynamic online periodical. For example, the articles may be stored in one or more servers that are accessible over the Internet. The articles may be associated tags that describe keywords, people, entities, subjects of the articles, and any other appropriate information.

A second index is generated, and stored in memory, to organize information about programs that are currently airing on television, actors and actresses who are in those programs, the subject matter of the programs, the genre of the programs, the air times of the programs, whether the programs are repeats, and any other appropriate information about the programs. The information may be stored in look-up tables, lists, or any other appropriate construct. Both the first and second indices are dynamic, in that they change as information associated therewith changes. The second index, in particular, may change more often, since it will change as information airing on television changes.

The first and second indices are used to identify (1201) articles to include in the dynamic online periodical. For example, tags from the second index are accessed and compared to tags from the first index. The tags from the second index relate to programs currently airing on television, and the tags from the first index relate to articles about, or that have some relationship to, those programs currently airing. Process 1200 identifies articles that are relevant (e.g., in some way related to) programs associated with tags in the second index. This may be done by identifying tags in the first and second indices that contain identical information, or by identifying tags in the first and second indices that have some portion or percentage of information in common. In some implementations, the subject matter of the tags from the first and second indices may be expanded, e.g., through use of one or more databases, to identify synonyms, and to use the resulting information for comparison. If two tags have identical information, or have a level of common information that exceeds some threshold, the two tags are deemed to match. Articles associated with tags from the first index that are deemed to match tags from the second index are identified as candidates for inclusion in the dynamic online periodical. In some implementations, all candidates are included in the dynamic online periodical, whereas in some other implementations, only candidates whose corresponding television programs are trending are included in the dynamic online periodical. The amount of activity relating to a program on social media may also dictate the placement of candidates in the dynamic online periodical.

In this context, trending does not require any absolute amount of activity, but rather includes determining that the amount of activity (e.g., occurrences of posts, discussions, mentions, etc.) relating to a program exceed a predefined threshold (1202). In some implementations, a search of public social media accounts may be performed to determine if a program is trending on social media. Any analysis of social media content used to create the electronic program guide, and that is appropriate in the context of a dynamic periodical, may be used to determine if a program is trending or popular. In some implementations, and with appropriate permission, a search of both public and private social media accounts may be performed to make the determination. The search may include accessing a database, search index, servers, or the like, to identify, and to quantify, social media activity or other appropriate activity relating to programs currently airing. In some implementations, quantifying the level of social media activity (or popularity in general) may include identifying programs that correspond to quotations in electronic communications over a network, such as a social network; determining a number of times that the information about a program has been posted to a social network; determining that the number of times exceeds a predefined threshold; and inferring that the program is popular or trending because the number of times exceeds the threshold.

If programs are deemed to be trending on social media based on the amount of activity exceeding a threshold then, in some implementations, the candidate articles associated with those programs, e.g., the articles identified based on the tags in the first index, may be incorporated into the dynamic online periodical. In some implementations, if programs associated with the candidate articles are deemed not to be trending, the candidate articles are excluded from the dynamic online periodical. In some implementations, as noted above, all candidate articles may be included in the dynamic online periodical regardless of whether corresponding programs are deemed to be trending or otherwise above some popularity threshold.

Figure 13:
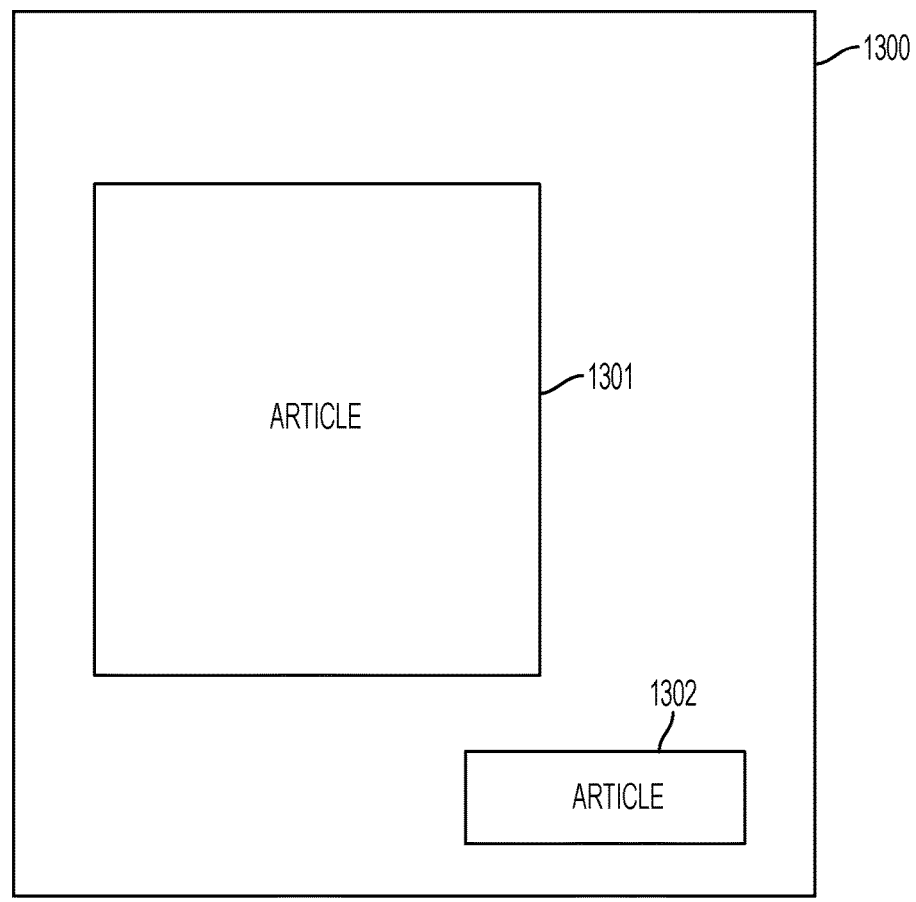
FIGS. 13 and 14 are example layouts of a dynamic online periodical.

The placement of the articles in the dynamic online periodical may be determined (1203) based on the popularity of the television program as determined, e.g., by social media posts activity relating to the programs that the articles are about, the ratings of those programs, or any other appropriate information that is indicative of the popularity of those programs. For example, a higher level of activity on social media (an indicator of popularity) about a program may result in articles about that program being figured more prominently in the dynamic online periodical than articles about programs that have a lower level of activity on social media. An article's prominence may be determined based on where that article is placed, the size of the article, or other appropriate features. For example, an article featured prominently in the dynamic online periodical may be on a first page of the dynamic online periodical, may be first in a list of articles in the dynamic online periodical, may be larger (e.g., a bigger font) or in a different color than other articles in the dynamic online periodical, may include graphics or other features that highlight the article, and so forth. In the example of FIG. 13, in dynamic online periodical 1300, article 1301 is shown as larger than article 1302 because the program relating to article 1301 is more popular than the program relating to article 1302.

Process 1200 generates (1204) data that is used to render the dynamic online periodical on one or more client devices, and outputs that data to the one or more client devices. In some implementations, the data may be output along with the electronic program guide described herein, either to the same device on which the electronic program guide is to be displayed, or to a different device then the one on which the electronic program guide is to be displayed. For example, data representing the electronic program guide may be output to a smart television, and data representing the dynamic online periodical may be output to a computing device, enabling a two-screen experience. In some implementations, the electronic program guide may be accessible via a hyperlink that is associated with (e.g., displayed with) the dynamic online periodical or elsewhere. In some implementations, the dynamic online periodical may be accessible via a hyperlink that is associated with (e.g., displayed with) the electronic program guide or elsewhere. In some implementations, the dynamic online periodical, or portions thereof, may be output to the activity streams of user social media accounts.

In some implementations, an article included in the dynamic online periodical can be accompanied by a hyperlink that allows the user to watch the subject of the article (e.g., the television program) on an appropriate web-based or streaming channel, and/or participate in online chat about the subject matter.

In some implementations, articles that are part of the dynamic online periodical can be served to readers based on the following criteria: whether the electronic program guide data indicates that programs are currently airing, and whether there is an article or articles tagged as containing information about those programs or actors or actresses in, or associated with, those programs. In some implementations, less or more criteria may be used to serve articles in the dynamic online periodical. As noted above, placement of that articles may be based on popularity of the programs, which is determined using some or all of the information used to determine the popularity and placement (e.g., ordering) of program information in the electronic programming guide.

Figure 14:
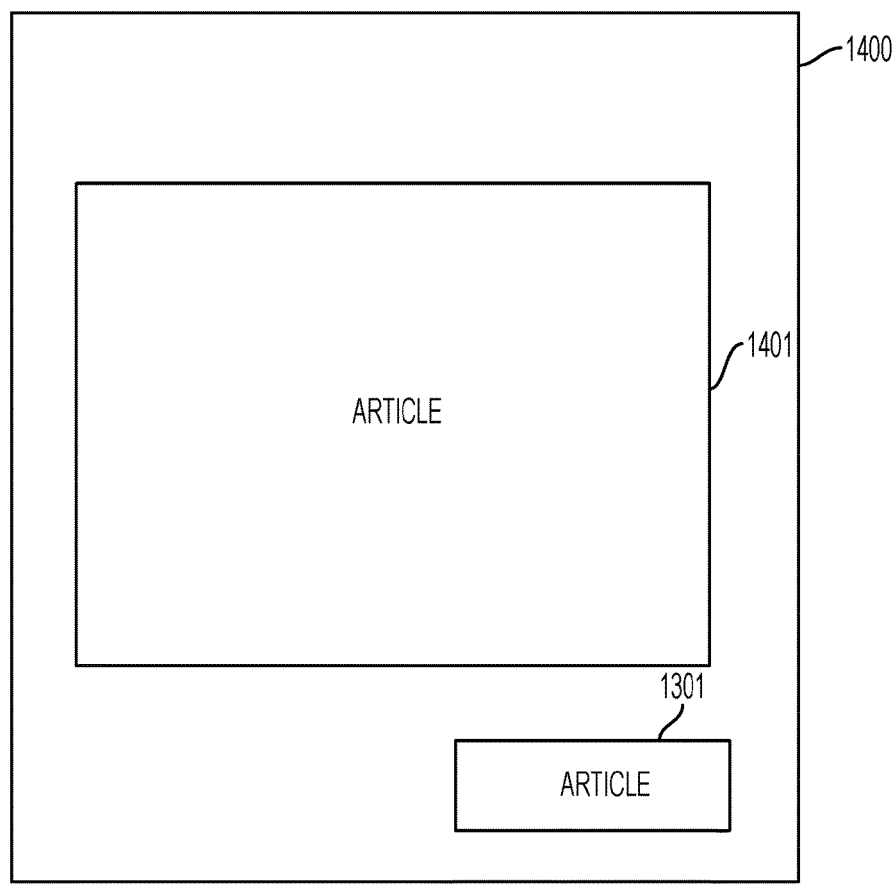

The online periodical described herein is "dynamic" in the sense that it changes over time, like the electronic program guide described herein, based on the popularity of television programs to which articles in the dynamic online periodical relate. As described above, one measure of popularity is social media activity; however, in some implementations, television ratings may also be used to affect what articles included the dynamic online periodical and where those articles are placed. For example, FIG. 14 shows dynamic online periodical 1400, which is a changed version of dynamic online periodical 1300 of FIG. 13. In this example, the program relating to article 1301 has lessened in popularity, resulting in the demotion of article 1301 to smaller status in dynamic online periodical 1400. In this example, a program relating to article 1401 is now the most popular program identified by the system, and is featured most prominently in dynamic online periodical 1400. Likewise, the program relating to article 1302 is no longer trending, or is less popular, resulting in its exclusion from the dynamic online periodical or its demotion to the second, third, fourth, etc. page (not shown) in the dynamic online periodical In some implementations, the dynamic online periodical may be updated, or refreshed, in concert (e.g., in synchronism) with updates or refreshes of the electronic program guide. In some implementations, the dynamic online periodical may be updated, or refreshed, independently of updates or refreshes of the electronic program guide.

Implementations

All or part of the processes described herein and their various modifications (hereinafter referred to as "the processes") can be implemented, at least in part, via a computer program product, i.e., a computer program tangibly embodied in one or more information carriers, e.g., in one or more tangible machine-readable storage media, for execution by, or to control the operation of, data processing apparatus, e.g., a programmable processor, a computer, or multiple computers A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Each computing device, such as a tablet computer, may include a hard drive for storing data and computer programs, and a processing device (e.g., a microprocessor) and memory (e.g., RAM) for executing computer programs. Each computing device may include an image capture device, such as a still camera or video camera. The image capture device may be built-in or simply accessible to the computing device.

Each computing device may include a graphics system, including a display screen. A display screen, such as an LCD or a CRT (Cathode Ray Tube) displays, to a user, images that are generated by the graphics system of the computing device. As is well known, display on a computer display (e.g., a monitor) physically transforms the computer display. For example, if the computer display is LCD-based, the orientation of liquid crystals can be changed by the application of biasing voltages in a physical transformation that is visually apparent to the user. As another example, if the computer display is a CRT, the state of a fluorescent screen can be changed by the impact of electrons in a physical transformation that is also visually apparent. Each display screen may be touch-sensitive, allowing a user to enter information onto the display screen via a virtual keyboard. On some computing devices, such as a desktop or smartphone, a physical QWERTY keyboard and scroll wheel may be provided for entering information onto the display screen. Each computing device, and computer programs executed thereon, may also be configured to accept voice commands, and to perform functions in response to such commands. For example, the process described herein may be initiated at a client, to the extent possible, via voice commands.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Any features described herein may be combined with features described in U.S. patent application Ser. No. 14/339,694, filed on Jul. 24, 2014 and entitled "Displaying Information Based On Recognition Of A Subject", the contents of which are incorporated herein by reference.

Other implementations not specifically described herein are also within the scope of the following claims.

What is claimed is:

1. A method comprising:
    storing, in computer memory, a profile of a user of an interactive video system implemented by one or more servers, the profile comprising identifying information for the user, at least some of the identifying information being unique to the user;
    outputting, by one or more processing devices, data to a video device of the user representing an electronic program guide, the electronic program guide comprising elements representing channels of video that are accessible through the electronic program guide, where the elements are ordered and displayed dynamically according to statistics maintained by the interactive video system, where the statistics include a number of unique identifiers (IDs) created in response to a user request to view a particular show, a number of Web socket identifiers that relate to a particular show, authentication keys associated with users, and a number of converted-video streams that relate to a particular show;
    receiving, by one or more processing devices, a selection from a computing device of the user to watch a channel of video that is accessible through the electronic program guide, the selection being identifiable as being from the user;
    adding, by one or more processing devices and based on the selection, at least some of the identifying information to a data structure stored in computer memory, the data structure associating the at least some identifying information with the channel of video corresponding to the selection;
    identifying, by one or more processing devices and based on the data structure, a group of users, which includes the user, who are watching the channel of video during a same time period;
    generating, by one more processing devices, data representing graphical objects associated with the users in the group who are watching the channel of video during the same time period and available to interact via the interactive video system; and
    outputting the data to the video device of the user to enable rendering the graphical objects on a display screen of the video device.

2. The method of claim 1, wherein the identifying information comprises one or more of the following: an authentication key associated with the user, an authentication key identifier associated with the user, a web socket identifier associated with the user, a web socket pointer identifier associated with the user, a user profile number, or a network address associated with the user.

3. The method of claim 1, further comprising, prior to receiving:
    receiving, by one or more processing devices, account information from the computing device of the user, the account information identifying an account of the user for a video provider of the user;
    authenticating, by one or more processing devices and based on at least some of the account information, the account of the user; and
    opening, by one or more processing devices and based on the authenticating, a network connection to enable streaming of data for the channel of video from the video provider to the video device of the user.

4. The method of claim 3, wherein the network connection passes through the one or more servers of the interactive video system; and
    wherein the method further comprises performing, by one or more processing devices, conversion of video data from one or more computing devices of the video provider to a format that is compatible for streaming over the network connection.

5. The method of claim 4, wherein conversion of the video data occurs in real-time, and is from an MPEG-based format to the format that is compatible for streaming over the network connection.

6. The method of claim 1, further comprising:
    generating, by one or more processing devices, the data representing the electronic program guide;
    wherein the selection is based on interaction with one or more of the elements of the electronic program guide.

7. The method of claim 6, wherein the electronic program guide includes a virtual alphanumeric keypad; and
    wherein interaction with the one or more elements occurs through interaction with the virtual alphanumeric keypad.

8. The method of claim 1, further comprising:
    receiving, by one or more processing devices, a selection from the computing device of the user of a graphical object corresponding to a different user, or group of users, available to interact via the interactive video system; and
    hosting, by one or more processing devices and based on the selection, a chat session between at least the user and the different user;
    wherein hosting the chat session comprises generating, by one or more processing devices, data representing the chat session, and outputting, by one or more processing devices, the data representing the chat session to the computing device of the user and to a computing device of the different user.

9. The method of claim 1,
    wherein the data representing the electronic program guide also represents data tags associated with the elements, the data tags being user-specific;

wherein the selection is based on user interaction with the electronic program guide and comprises a data tag associated with the user, the selection being identifiable as being from the user because of the data tag.

10. The method of claim 1, wherein the data structure comprises a linked list or a hashmap, the linked list or hashmap associating users with channels of video that the users are viewing during the same time period.

11. The method of claim 1, wherein the video device of the user is the computing device of the user.

12. The method of claim 1, wherein the video device is a television that is different from the computing device of the user.

13. One or more non-transitory machine-readable storage devices storing instructions that are executable by one or more processing devices to perform operations comprising:
storing, in computer memory, a profile of a user of an interactive video system implemented by one or more servers, the profile comprising identifying information for the user, at least some of the identifying information being unique to the user;
outputting, by one or more processing devices, data to a video device of the user representing an electronic program guide, the electronic program guide comprising elements representing channels of video that are accessible through the electronic program guide, where the elements are ordered and displayed dynamically according to statistics maintained by the interactive video system, where the statistics include a number of unique identifiers (IDs) created in response to a user request to view a particular show, a number of Web socket identifiers that relate to a particular show, authentication keys associated with users, and a number of converted-video streams that relate to a particular show;
receiving, by the one or more processing devices, a selection from a computing device of the user to watch a channel of video that is accessible through the electronic program guide, the selection being identifiable as being from the user;
adding, by the one or more processing devices and based on the selection, at least some of the identifying information to a data structure stored in computer memory, the data structure associating the at least some identifying information with the channel of video corresponding to the selection;
identifying, by the one or more processing devices and based on the data structure, a group of users, which includes the user, who are watching the channel of video during a same time period;
generating, by the one more processing devices, data representing graphical objects associated with the users in the group who are watching the channel of video during the same time period and available to interact via the interactive video system; and
outputting the data to the video device of the user to enable rendering the graphical objects on a display screen of the video device.

14. The one or more non-transitory machine-readable storage devices of claim 13, wherein the identifying information comprises one or more of the following: an authentication key associated with the user, an authentication key identifier associated with the user, a web socket identifier associated with the user, a web socket pointer identifier associated with the user, a user profile number, or a network address associated with the user.

15. The one or more non-transitory machine-readable storage devices of claim 13, wherein the operations comprise, prior to receiving:
receiving, by the one or more processing devices, account information from the computing device of the user, the account information identifying an account of the user for a video provider of the user;
authenticating, by the one or more processing devices and based on at least some of the account information, the account of the user; and
opening, by the one or more processing devices and based on the authenticating, a network connection to enable streaming of data for the channel of video from the video provider to the video device of the user.

16. The one or more non-transitory machine-readable storage devices of claim 15, wherein the network connection passes through the one or more servers of the interactive video system; and
wherein the operations comprise performing, by the one or more processing devices, conversion of video data from one or more computing devices of the video provider to a format that is compatible for streaming over the network connection.

17. The one or more non-transitory machine-readable storage devices of claim 16, wherein conversion of the video data occurs in real-time, and is from an MPEG-based format to the format that is compatible for streaming over the network connection.

18. The one or more non-transitory machine-readable storage devices of claim 13, wherein the operations comprise:
generating, by the one or more processing devices, the data representing the electronic program guide;
wherein the selection is based on interaction with one or more of the elements of the electronic program guide.

19. The one or more non-transitory machine-readable storage devices of claim 18, wherein the electronic program guide includes a virtual alphanumeric keypad; and
wherein interaction with the one or more elements occurs through interaction with the virtual alphanumeric keypad.

20. The one or more non-transitory machine-readable storage devices of claim 13, wherein the operations comprise:
receiving, by the one or more processing devices, a selection from the computing device of the user of a graphical object corresponding to a different user, or group of users, available to interact via the interactive video system; and
hosting, by one or more processing devices and based on the selection, a chat session between at least the user and the different user;
wherein hosting the chat session comprises generating, by the one or more processing devices, data representing the chat session, and outputting, by the one or more processing devices, the data representing the chat session to the computing device of the user and to a computing device of the different user.

21. The one or more non-transitory machine-readable storage devices of claim 13, wherein
the data representing the electronic program guide also represents data tags associated with the elements, the data tags being user-specific;
wherein the selection is based on user interaction with the electronic program guide and comprises a data tag associated with the user, the selection being identifiable as being from the user because of the data tag.

22. The one or more non-transitory machine-readable storage devices of claim 13, wherein the data structure comprises a linked list or a hashmap, the linked list or hashmap associating users with channels of video that the users are viewing during the same time period.

23. The one or more non-transitory machine-readable storage devices of claim 13, wherein the video device of the user is the computing device of the user.

24. The one or more non-transitory machine-readable storage devices of claim 13, wherein the video device is a television that is different from the computing device of the user.

25. A system comprising:
memory storing instructions that are executable; and
one or more processing devices to execute the instruction to perform operations comprising:
  storing, in computer memory, a profile of a user of an interactive video system implemented by one or more servers, the profile comprising identifying information for the user, at least some of the identifying information being unique to the user;
  outputting, by one or more processing devices, data to a video device of the user representing an electronic program guide, the electronic program guide comprising elements representing channels of video that are accessible through the electronic program guide, where the elements are ordered and displayed dynamically according to statistics maintained by the interactive video system, where the statistics include a number of unique identifiers (IDs) created in response to a user request to view a particular show, a number of Web socket identifiers that relate to a particular show, authentication keys associated with users, and a number of converted-video streams that relate to a particular show;
  receiving, by the one or more processing devices, a selection from a computing device of the user to watch a channel of video that is accessible through the electronic program guide, the selection being identifiable as being from the user;
  adding, by the one or more processing devices and based on the selection, at least some of the identifying information to a data structure stored in computer memory, the data structure associating the at least some identifying information with the channel of video corresponding to the selection;
  identifying, by the one or more processing devices and based on the data structure, a group of users, which includes the user, who are watching the channel of video during a same time period;
  generating, by the one more processing devices, data representing graphical objects associated with the users in the group who are watching the channel of video during the same time period and available to interact via the interactive video system; and
  outputting the data to the video device of the user to enable rendering the graphical objects on a display screen of the video device.

26. The system of claim 25, wherein the identifying information comprises one or more of the following: an authentication key associated with the user, an authentication key identifier associated with the user, a web socket identifier associated with the user, a web socket pointer identifier associated with the user, a user profile number, or a network address associated with the user.

27. The system of claim 25, wherein the operations comprise, prior to receiving:
  receiving, by the one or more processing devices, account information from the computing device of the user, the account information identifying an account of the user for a video provider of the user;
  authenticating, by the one or more processing devices and based on at least some of the account information, the account of the user; and
  opening, by the one or more processing devices and based on the authenticating, a network connection to enable streaming of data for the channel of video from the video provider to the video device of the user.

28. The system of claim 27, wherein the network connection passes through the one or more servers of the interactive video system; and
wherein the operations comprise performing, by the one or more processing devices, conversion of video data from one or more computing devices of the video provider to a format that is compatible for streaming over the network connection.

29. The system of claim 28, wherein conversion of the video data occurs in real-time, and is from an MPEG-based format to the format that is compatible for streaming over the network connection.

30. The system of claim 25, wherein the operations comprise:
  generating, by the one or more processing devices, the data representing the electronic program guide;
  wherein the selection is based on interaction with one or more of the elements of the electronic program guide.

31. The system of claim 30, wherein the electronic program guide includes a virtual alphanumeric keypad; and
wherein interaction with the one or more elements occurs through interaction with the virtual alphanumeric keypad.

32. The system of claim 25, wherein the operations comprise:
  receiving, by the one or more processing devices, a selection from the computing device of the user of a graphical object corresponding to a different user, or group of users, available to interact via the interactive video system; and
  hosting, by one or more processing devices and based on the selection, a chat session between at least the user and the different user;
  wherein hosting the chat session comprises generating, by the one or more processing devices, data representing the chat session, and outputting, by the one or more processing devices, the data representing the chat session to the computing device of the user and to a computing device of the different user.

33. The system of claim 25, wherein
the data representing the electronic program guide also represents data tags associated with the elements, the data tags being user-specific;
wherein the selection is based on user interaction with the electronic program guide and comprises a data tag associated with the user, the selection being identifiable as being from the user because of the data tag.

34. The system of claim 25, wherein the data structure comprises a linked list or a hashmap, the linked list or hashmap associating users with channels of video that the users are viewing during the same time period.

35. The system of claim 25, wherein the video device of the user is the computing device of the user.

36. The system of claim 25, wherein the video device is a television that is different from the computing device of the user.

\* \* \* \* \*

UNITED STATES PATENT AND TRADEMARK OFFICE
CERTIFICATE OF CORRECTION

| | |
|---|---|
| PATENT NO. | : 9,854,317 B1 |
| APPLICATION NO. | : 14/949543 |
| DATED | : December 26, 2017 |
| INVENTOR(S) | : Kwabena Benoni Abboa-Offei et al. |

Page 1 of 1

It is certified that error appears in the above-identified patent and that said Letters Patent is hereby corrected as shown below:

On the Title Page

Item (71) ("Applicant") delete "Brooklyn, MA" and insert --Brooklyn, NY-- therefor.

Signed and Sealed this
Tenth Day of April, 2018

Andrei Iancu
*Director of the United States Patent and Trademark Office*